(12) United States Patent
Imamura et al.

(10) Patent No.: US 8,844,670 B2
(45) Date of Patent: Sep. 30, 2014

(54) ELECTRIC POWER STEERING DEVICE

(75) Inventors: Yousuke Imamura, Maebashi (JP); Daisuke Matsumoto, Maebashi (JP)

(73) Assignee: NSK Ltd., Tokyo (JP)

( * ) Notice: Subject to any disclaimer, the term of this patent is extended or adjusted under 35 U.S.C. 154(b) by 182 days.

(21) Appl. No.: 13/056,013

(22) PCT Filed: Aug. 26, 2010

(86) PCT No.: PCT/JP2010/005264
§ 371 (c)(1),
(2), (4) Date: Jan. 26, 2011

(87) PCT Pub. No.: WO2011/027521
PCT Pub. Date: Mar. 10, 2011

(65) Prior Publication Data
US 2012/0145472 A1 Jun. 14, 2012

(30) Foreign Application Priority Data

Sep. 2, 2009 (JP) ................................. 2009-202419

(51) Int. Cl.
*B62D 5/04* (2006.01)
*H02P 29/02* (2006.01)
*H02P 21/00* (2006.01)

(52) U.S. Cl.
CPC ............ *B62D 5/0487* (2013.01); *H02P 29/022* (2013.01); *B62D 5/0484* (2013.01); *B62D 5/046* (2013.01); *H02P 21/0003* (2013.01)
USPC ............. 180/446; 180/444; 180/443; 701/41; 701/42; 701/43

(58) Field of Classification Search
USPC ................. 180/446, 444, 443; 701/41, 42, 43
See application file for complete search history.

(56) References Cited

U.S. PATENT DOCUMENTS

| 4,819,170 A | * | 4/1989 | Shimizu ........................... 701/41 |
| 6,915,194 B2 | * | 7/2005 | Kodama et al. ................. 701/41 |

(Continued)

FOREIGN PATENT DOCUMENTS

| JP | 7-165098 A | 6/1995 |
| JP | 2007-116849 A | 5/2007 |

(Continued)

OTHER PUBLICATIONS

International Search Report dated Nov. 22, 2010 (two (2) pages).

(Continued)

*Primary Examiner* — Joseph M Rocca
*Assistant Examiner* — Marlon Arce
(74) *Attorney, Agent, or Firm* — Crowell & Moring LLP

(57) ABSTRACT

An electric power steering device which, when an abnormality occurs in one phase of a three-phase brushless motor, permits continuous driving of the motor using the remaining two phases without deteriorating the steering feeling. When a power distribution abnormality of a drive system of one phase of respective phase coils has been detected by an abnormality detection section, an abnormal-time phase current instruction value for using the remaining two phase coils is calculated based on a steering assist electric current instruction value, and an electric motor is driven based on that abnormal-time phase current instruction value. At that time, when an electrical angle falls within an acceleration region, the abnormal-time phase current instruction value is increased or decreased for correction in order to accelerate rotation of the three-phase brushless motor in a steering direction.

17 Claims, 14 Drawing Sheets

(56) References Cited

U.S. PATENT DOCUMENTS

| | | | |
|---|---|---|---|
| 7,459,879 B2* | 12/2008 | Kezobo et al. | 318/803 |
| 7,471,003 B2* | 12/2008 | Kobayashi et al. | 290/40 C |
| 7,694,777 B2* | 4/2010 | Yamashita et al. | 180/443 |
| 8,027,766 B2* | 9/2011 | Nozawa et al. | 701/41 |
| 8,040,096 B2* | 10/2011 | Taniguchi | 318/490 |
| 8,116,945 B2* | 2/2012 | Nozawa | 701/41 |
| 8,160,777 B2* | 4/2012 | Tamaizumi | 701/42 |
| 2007/0107973 A1 | 5/2007 | Jiang et al. | |
| 2007/0176577 A1 | 8/2007 | Kezobo et al. | |
| 2008/0035411 A1* | 2/2008 | Yamashita et al. | 180/443 |
| 2008/0067960 A1* | 3/2008 | Maeda et al. | 318/400.02 |
| 2008/0309270 A1* | 12/2008 | Suzuki | 318/432 |
| 2009/0021207 A1 | 1/2009 | Kezobo et al. | |
| 2009/0132126 A1* | 5/2009 | Tamaizumi | 701/42 |
| 2009/0187312 A1* | 7/2009 | Nozawa et al. | 701/42 |
| 2009/0192665 A1* | 7/2009 | Nozawa | 701/29 |
| 2009/0240389 A1* | 9/2009 | Nomura et al. | 701/29 |
| 2009/0322268 A1* | 12/2009 | Imamura et al. | 318/400.23 |
| 2010/0017063 A1 | 1/2010 | Maeda | |

FOREIGN PATENT DOCUMENTS

| | | |
|---|---|---|
| JP | 2009-6963 A | 1/2009 |
| WO | WO 2005/091488 A1 | 9/2005 |
| WO | WO 2007/129359 A1 | 11/2007 |

OTHER PUBLICATIONS

English-language International Search Report dated Nov. 22, 2010 (two (2) pages) (Japanese-language version previously submitted as document C1).

International Preliminary Report on Patentability dated Apr. 11, 2012 (Seven (7) pages).

Japanese Office Action with English Translation dated May 14, 2013 (five (5) pages).

\* cited by examiner

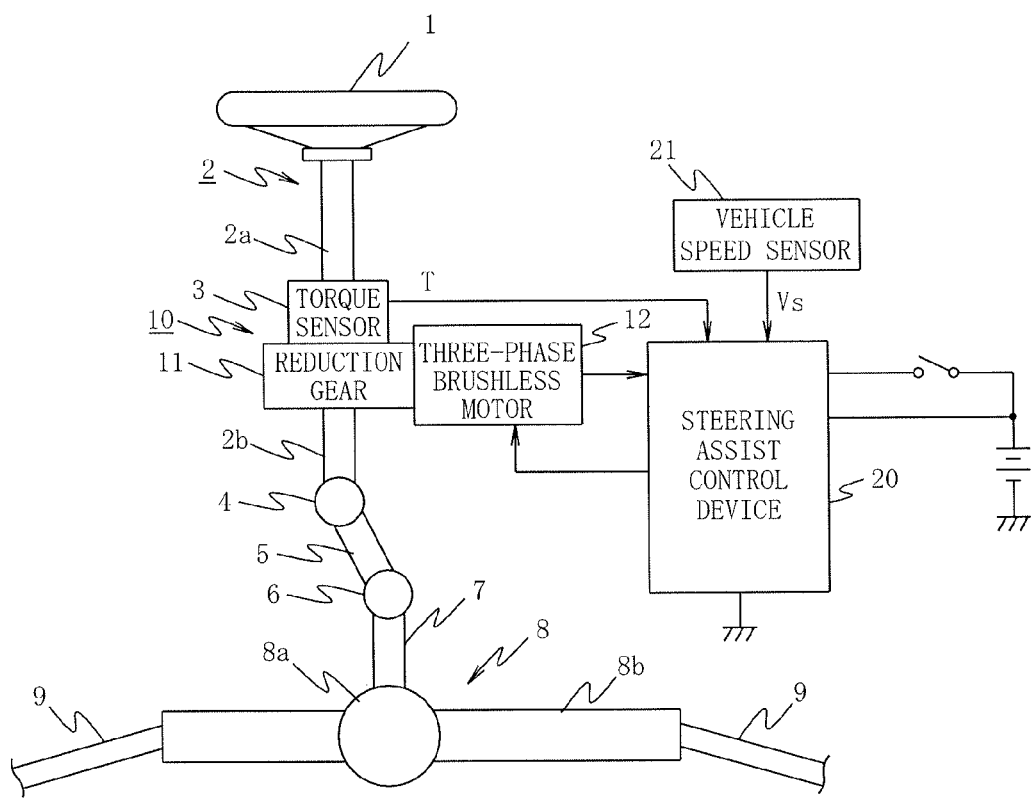
F I G. 1

*FIG. 8A*
x (WIRE BREAKAGE)
*FIG. 8B*
<STATOR MAGNETIC FIELD
AT TIME OF U-PHASE FAILURE>
$1_U = 0 [A]$
$|1_W| = |1_V|$
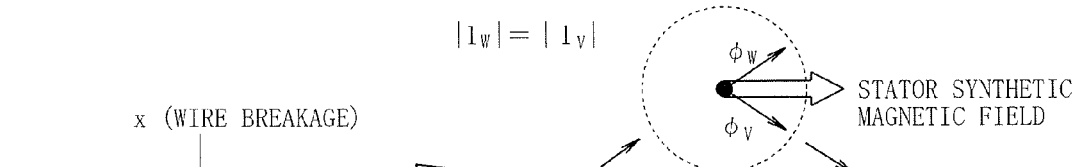
STATOR SYNTHETIC MAGNETIC FIELD
$1_W > 0$  $1_V < 0$
*FIG. 8C*
$1_U = 0 [A]$
$|1_W| = |1_V|$
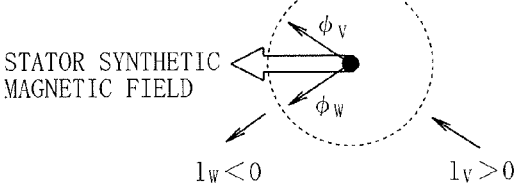
STATOR SYNTHETIC MAGNETIC FIELD
$1_W < 0$  $1_V > 0$

ELECTRIC POWER STEERING DEVICE

TECHNICAL FIELD

The present invention relates to an electric power steering device, which provides to a steering system a steering assist force for driving and controlling a three-phase brushless motor to reduce a driver's steering load.

BACKGROUND ART

The technology disclosed in Patent Document 1 is an example of a conventional electric power steering device. With this technology, when an abnormality occurs in one phase of a three-phase brushless motor, an abnormality electric current instruction value for keeping motor torques almost constant is calculated based on back electromotive voltage information of the remaining two phases so that the motor is continuously driven based on the above abnormality electric current instruction value.

However, the amount of electric current passed through the motor is limited by restrictions such as hardware and the like. Therefore, a constant motor torque cannot be obtained in the angular area in which the electric current limit is reached, so the driver feels as if the steering wheel were caught by something, thereby deteriorating the steering feeling.

There is a technology of providing an over-assist characteristic in a smaller angular area than the angular area in which a constant torque is not obtained so as to increase the motor torque, and providing an under-assist characteristic in a larger angler area than the angular area in which the constant torque is not obtained so as to decrease the motor torque (See Patent Document 2, for example). This technology aims at accelerating the rotation of the motor before reaching the angular area in which the constant torque is not obtained so as to pass over this angular area.

PRIOR ART DOCUMENTS

Patent Documents

Patent Document 1: JP 2009-6963 A
Patent Document 2: WO 2005/091488

SUMMARY OF THE INVENTION

Problem to be Solved

The electric power steering device disclosed in the above Patent Document 2 performs turn-from-center steering, and in the case where both the motor torque direction and the motor rotation direction are positive directions, rotation of the motor may be accelerated in the positive direction by increasing the motor torque just before reaching the angular area in which a constant torque is not obtained. However, since the motor torque is reduced immediately after passing over the angular area, rotation of the motor easily decreases due to the external load, and easily stops in the angular area in which the constant torque is not obtained.

Moreover, in the case where the return-to-center steering is performed, the motor torque direction is a positive one, and the motor rotation direction is a negative one, rotation of the motor may be accelerated in the negative direction by decreasing the motor torque just before reaching the angular area in which the constant torque is not obtained. However, since the motor torque is increased immediately after passing over the angular area, this becomes a braking torque whereby the motor may stop in the angular area in which the constant torque cannot be obtained.

As a result, an insufficient assist is provided while shifting from return-to-center steering to turn-from-center steering, and thereby presenting to the driver a feeling as if the steering wheel were caught on something.

Therefore, it is an object of the present invention to provide an electric power steering device which, when an abnormality has occurred in one phase of a three-phase brushless motor, permits continuous driving of the motor using the remaining two phases without deteriorating the steering feeling.

Solution to the Problem

In order to achieve the above object, a first aspect of an electrical power steering device according to the present invention is characterized by including a three-phase brushless motor having respective phase coils connected in a star connection for applying a steering assist force to a steering system; a steering torque detection section for detecting a steering torque transmitted to the steering system; and a motor control section for controlling the three-phase brushless motor to drive based on at least the steering torque detected by the steering torque detection section. The motor control section includes a coil drive system abnormality detection section for detecting a power distribution abnormality in a drive system of the respective coils; a steering assist electric current instruction value calculation section for calculating a steering assist electric current instruction value based on the steering torque detected by the steering torque detection section; a normal-time motor instruction value calculation section for, when an abnormality of the drive system of the respective phase coils has not been detected by the coil drive system abnormality detection section, calculating a normal-time phase current instruction value using three phase coils based on the steering assist electric current instruction value; an abnormal-time motor instruction value calculation section for, when an abnormality of the drive system of one phase of the respective phase coils has been detected by the coil drive system abnormality detection section, calculating an abnormal-time phase current instruction value based on the steering assist electric current instruction value such that sum of phase current instruction values of the remaining two phases is zero; a motor drive control section for selecting any one of the normal-time phase current instruction value calculated by the normal-time motor instruction value calculation section and the abnormal-time phase current instruction value calculated by the abnormal-time motor instruction value calculation section, and for controlling the three-phase brushless motor to drive based on the selected phase current instruction value; an acceleration region judgment section for judging whether or not an electrical angle of the three-phase brushless motor falls within an acceleration region, which is a predetermined angular area including the electrical angle at which the sign of the abnormal-time phase current instruction value calculated by the abnormal-time motor instruction value calculation section is inverted; and a motor rotation acceleration section for, when the electrical angle of the three-phase brushless motor is judged to fall within the acceleration region, correcting the abnormal-time phase current instruction value calculated by the abnormal-time motor instruction value calculation section so as to accelerate rotation of the three-phase brushless motor in a steering direction.

Moreover, a second aspect of the present invention is characterized in that the acceleration region is set to be wider as the steering assist electric current instruction value calculated by the steering assist electric current instruction value calculation section is larger.

Furthermore, a third aspect of the present invention is characterized in that the acceleration region is an angular area including before and after an angular area in which the abnormal-time phase current instruction value calculated by the abnormal-time motor instruction value calculation section reaches a phase current upper limit value corresponding to an upper limit of electric current values by which the drive system of the respective phase coils is energized.

Yet even further, a fourth aspect of the present invention is characterized by further including a steering direction judgment section for judging whether a steering manipulation causes a steering wheel is in a turn-from-center direction or a return-to-center direction. The motor rotation acceleration section changes a correction method of the abnormal-time phase current instruction value in accordance with the steering direction judged by the steering direction judgment section.

Yet even further, a fifth aspect of the present invention is characterized in that the motor rotation acceleration section increases for correction the abnormal-time phase current instruction value when the steering direction judged by the steering direction judgment section is the turn-from-center direction.

Yet even further, a sixth aspect of the present invention is characterized in that the motor rotation acceleration section corrects the abnormal-time phase current instruction value to be zero or substantially zero when the steering direction judged by the steering direction judgment section is the return-to-center direction and the steering assist electric current instruction value calculated by the steering assist electric current instruction value calculation section is equal to or greater than a predetermined value.

Yet even further, a seventh aspect of the present invention is characterized in that the motor rotation acceleration section inverts for correction the sign of the abnormal-time phase current instruction value when the steering direction judged by the steering direction judgment section is the return-to-center direction and the steering assist electric current instruction value calculated by the steering assist electric current instruction value calculation section is smaller than the predetermined value.

Yet even further, an eighth aspect of the present invention is characterized in that the motor rotation acceleration section inverts for correction the sign of the abnormal-time phase current instruction value and decrease the abnormal-time phase current instruction value when the steering direction judged by the steering direction judgment section is the return-to-center direction and the steering assist electric current instruction value calculated by the steering assist electric current instruction value calculation section is smaller than the predetermined value.

Yet even further, a ninth aspect of the present invention is characterized in that the motor rotation acceleration section is provided with a gradual-change region in which a correction amount of the abnormal-time phase current instruction value is gradually changed according to the steering assist electric current instruction value during change-over of the correction method of the abnormal-time phase current instruction value based on the predetermined value when the steering direction judged by the steering direction judgment section is the return-to-center direction.

Yet even further, a tenth aspect of the present invention is characterized in that the motor rotation acceleration section limits an upper limit of a rate of change in the abnormal-time phase current instruction value after corrected by a predetermined rate of change limiting value.

Yet even further, an eleventh aspect of the present invention is characterized by further including a vehicle speed detection section for detecting a vehicle speed. The motor control section includes an electric current limit section for limiting a maximum value of the abnormal-time phase current instruction value by an electric current limiting value in accordance with the vehicle speed detected by the vehicle speed detection section. The electric current limit section sets the electric current limiting value to zero or substantially zero when the vehicle speed detected by the vehicle speed detection section is smaller than a predetermined value.

Yet even further, a twelfth aspect of the present invention is characterized in that the motor control section includes a decreasing correction section for decreasing for correction the abnormal-time phase current instruction value calculated by the abnormal-time phase current instruction value calculation section when the electrical angle is judged by the acceleration region judgment section as being outside of the acceleration region.

Advantageous Effects of the Invention

According to the present invention, when an abnormality occurs in one phase of a three-phase brushless motor, continuous driving of the motor using the remaining two phases is possible. Moreover, since intentional acceleration of rotation of the motor is carried out in the steering direction in the acceleration region including an electrical angle in which the sign of the abnormality phase current instruction value calculated by the abnormal-time phase current instruction value calculation section is inverted, generation of a braking torque in the acceleration region may be prevented. As a result, an unstable output angular area in which motor torque decreases may be efficiently passed over by a motor inertia force and the steering feeling may be improved.

BRIEF DESCRIPTION OF THE DRAWINGS

FIG. 1 is a system schematic diagram of an electric power steering device of the present invention;

FIG. 8 is an illustration of a configuration of a stator magnetic field model during two-phase power distribution in the three-phase brushless motor;

DESCRIPTION OF EMBODIMENTS

Figure 2:
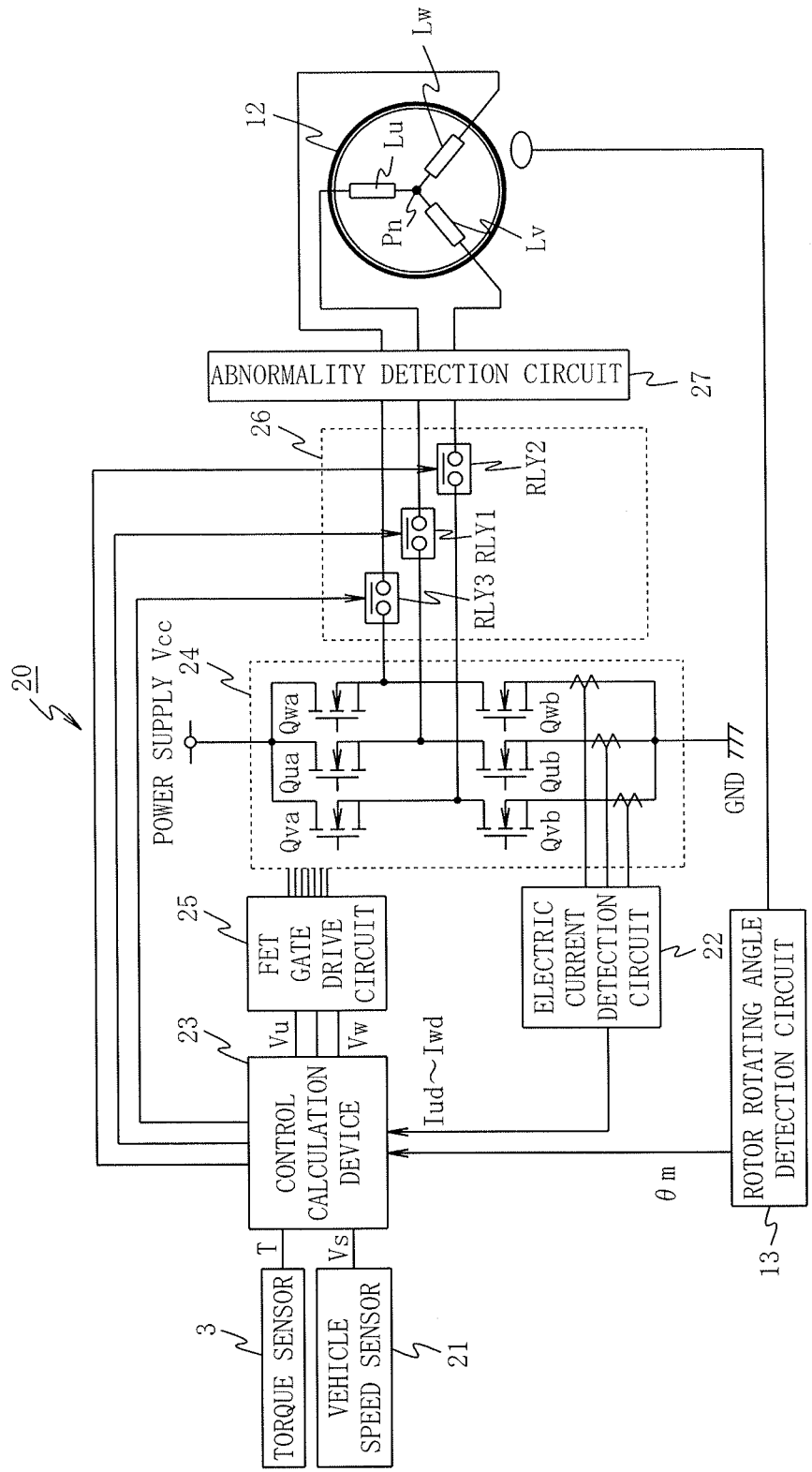
FIG. 2 is a block diagram illustrative of a configuration of a steering assist control device.

Embodiments of the present invention will now be described with reference to the drawings.

First Embodiment

Configuration

FIG. 1 is an overall schematic view illustrative of a first embodiment of the present invention.

In the drawing, reference numeral 1 denotes a steering wheel, where a steering force applied from a driver to the steering wheel 1 is transmitted to a steering shaft 2. This steering shaft 2 has an input shaft 2a and an output shaft 2b. An end of the input shaft 2a is connected to the steering wheel 1, and the other end is connected to an end of the output shaft 2b via a steering torque sensor 3.

The steering force transmitted to the output shaft 2b is transmitted to a lower shaft 5 via a universal joint 4 and then transmitted to a pinion shaft 7 via a universal joint 6. The steering force transmitted to the pinion shaft 7 is transmitted to a tie rod 9 via a steering gear 8, thereby turning wheels not illustrated in the drawing. In this case, the steering gear 8 is a rack-and-pinion type gear having a pinion 8a connected to the pinion shaft 7 and a rack 8b meshing with the pinion 8a, and the rotary motion transmitted to the pinion 8a is converted by the rack 8b into translatory movement in the vehicle width direction.

A steering assist mechanism 10, which transmits a steering assist force to the output shaft 2b of the steering shaft 2, is connected to the output shaft 2b. The steering assist mechanism 10 includes a decelerating gear 11 connected to the output shaft 2b, and a three-phase brushless motor 12, which is connected to the decelerating gear 11, generates a steering assist force.

The steering torque sensor 3 is detects a steering torque applied from the steering wheel 1 and then transmitted to the input shaft 2a. For example, the steering torque sensor 3 is configured to convert the steering torque to twist angular displacement of a torsion bar, not illustrated, for inserting the steering torque between the input shaft 2a and the output shaft 2b, and then convert the twist angular displacement to resistance variation or magnetic variation to be detected.

Moreover, as shown in FIG. 2, the three-phase brushless motor 12 is made into a star connection by connecting one ends of a U-phase coil Lu, a V-phase coil Lv, and a W-phase coil Lw to each other, and the other ends of the respective coils Lu, Lv, and Lw are connected to a steering assist control device 20 to be supplied with motor drive currents Iu, Iv, and Iw, respectively. Furthermore, the three-phase brushless motor 12 includes a rotor rotation angle detection circuit 13, which is configured of a Hall device, a resolver, and the like, for detecting the rotational position of a rotor.

A steering torque T detected by the steering torque sensor 3, a vehicle speed Vs detected by a vehicle speed sensor 21, and a rotor rotation angle $\theta m$ detected by the rotor rotating angle detection circuit 13 are input to the steering assist control device 20. Moreover, motor drive current detection values Iud, Ivd and Iwd are output from a motor current detection circuit 22, which detects the motor drive currents Iu, Iv, and Iw to be supplied to the respective phase coils Lu, Lv, and Lw of the three-phase brushless motor 12, and are then input to the steering assist control device 20.

The steering assist control device 20 includes: a control calculation device 23, which calculates a steering assist electric current instruction value based on the steering torque T, the vehicle speed Vs, the motor drive current detection values Iud, Ivd and Iwd, and the rotor rotation angle $\theta m$, and then outputs respective phase voltage instruction values Vu, Vv, and Vw; a motor drive circuit 24, which is configured of field-effect transistors (FETs) that drive the three-phase brushless motor 12; and a FET gate drive circuit 25, which controls the gate current of the field-effect transistor of the motor drive circuit 24 based on the phase voltage instruction values Vu, Vv, and Vw output from the control calculation device 23. The steering assist control device 20 further includes: an interrupt relay circuit 26, which is connected between the motor drive circuit 24 and the three-phase brushless motor 12; and an abnormality detection circuit 27, which detects abnormalities of the motor drive currents Iu, Iv, and Iw that are supplied to the three-phase brushless motor 12.

(Configuration of Control Calculation Device 23)

Figure 3:
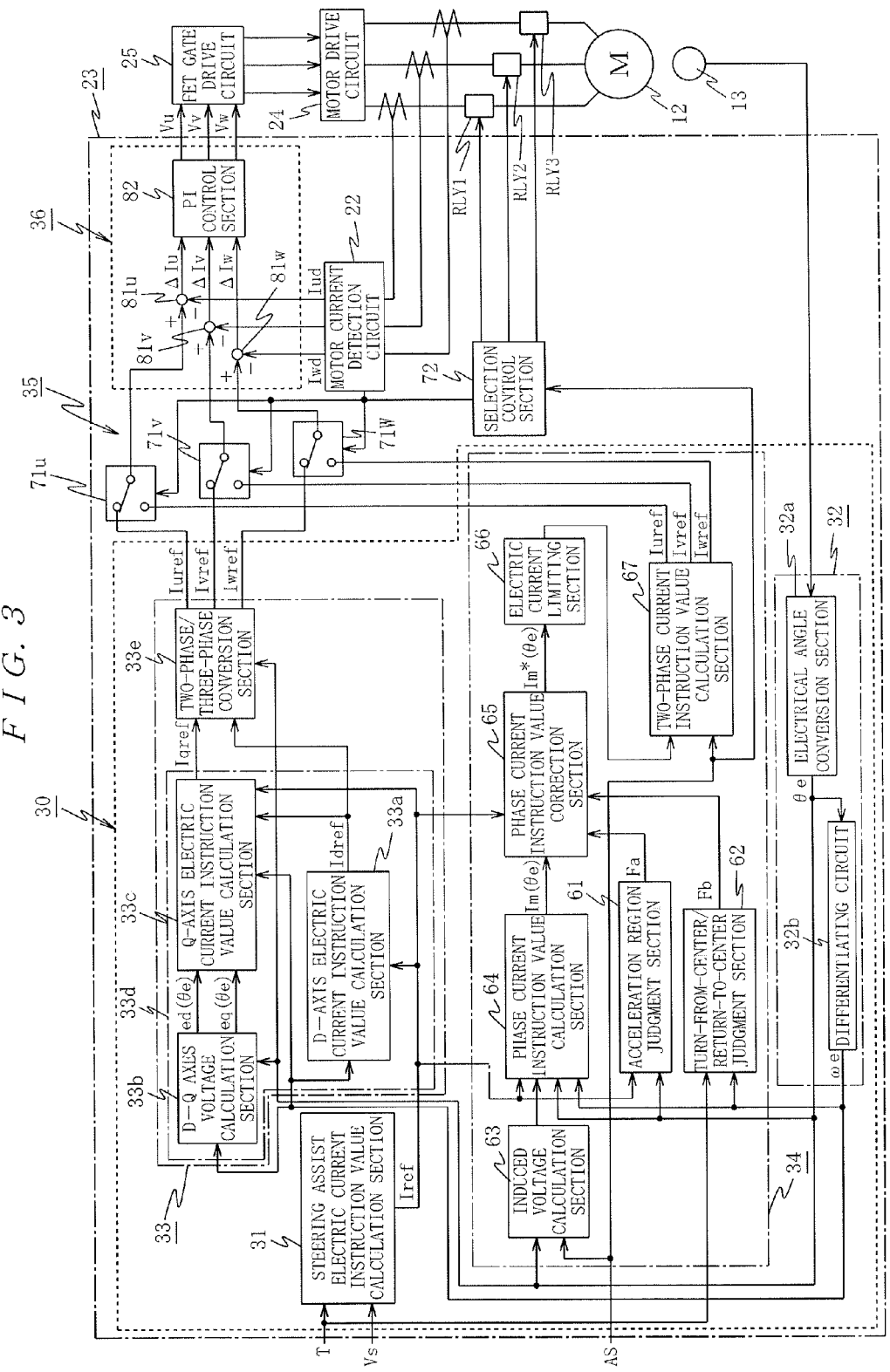
FIG. 3 is a block diagram illustrative of a configuration of a control calculation device 23 according to a first embodiment.

FIG. 3 is a block diagram illustrative of the configuration of the control calculation device 23.

The control calculation device 23 includes: an instruction value output section 30, which is configured of a steering assist electric current instruction value calculation section 31; an angle information calculation section 32; a normal-time motor instruction value calculation section 33; an abnormal-time motor instruction value calculation section 34; an instruction value selection section 35; and a motor current control section 36, as shown in FIG. 3.

The steering assist electric current instruction value calculation section 31 is supplied with the steering torque T detected by the steering torque sensor 3 and the vehicle speed Vs detected by the vehicle speed sensor 21, and then calculates a steering assist electric current instruction value Iref based thereon.

The angle information calculation section 32 calculates an electrical angle $\theta e$ and an electric angular velocity $\omega e$ based on the rotor rotation angle $\theta m$ detected by the rotor rotating angle detection circuit 13.

The normal-time motor instruction value calculation section 33 calculates three-phase current instruction values (normal-time phase current instruction values) Iuref to Iwref based on the steering assist electric current instruction value Iref, the electrical angle $\theta e$, and the electric angular velocity $\omega e$.

The abnormal-time motor instruction value calculation section 34 calculates two-phase current instruction values (abnormal-time phase current instruction values) Iiref and Ijref for normal coils Li (i equals u to w) and Lj (j equals v to u) based on an abnormality detection signal AS, the steering assist electric current instruction value Iref, the electrical angle $\theta e$, and the electric angular velocity $\omega e$ input from an abnormality detection circuit 27 to be described later. At this time, Iiref and Ijref are calculated with mutually opposite signs and equal absolute values. Namely, the sum of Iiref and Ijref is zero, and signs thereof are inverted at the common electrical angle θe.

The instruction value selection section 35 selects either the three-phase current instruction values Iuref to Iwref output from the normal-time motor instruction value calculation section 33 or the two-phase current instruction values Iiref and Ijref output from the abnormal-time motor instruction value calculation section 34.

The motor current control section 36 performs a current feedback process using the electric current instruction values selected by the instruction value selection section 35 and the motor current detection values Iud, Ivd and Iwd detected by the motor current detection circuit 22.

Processing executed in each block is described in detail below.

Figure 4:
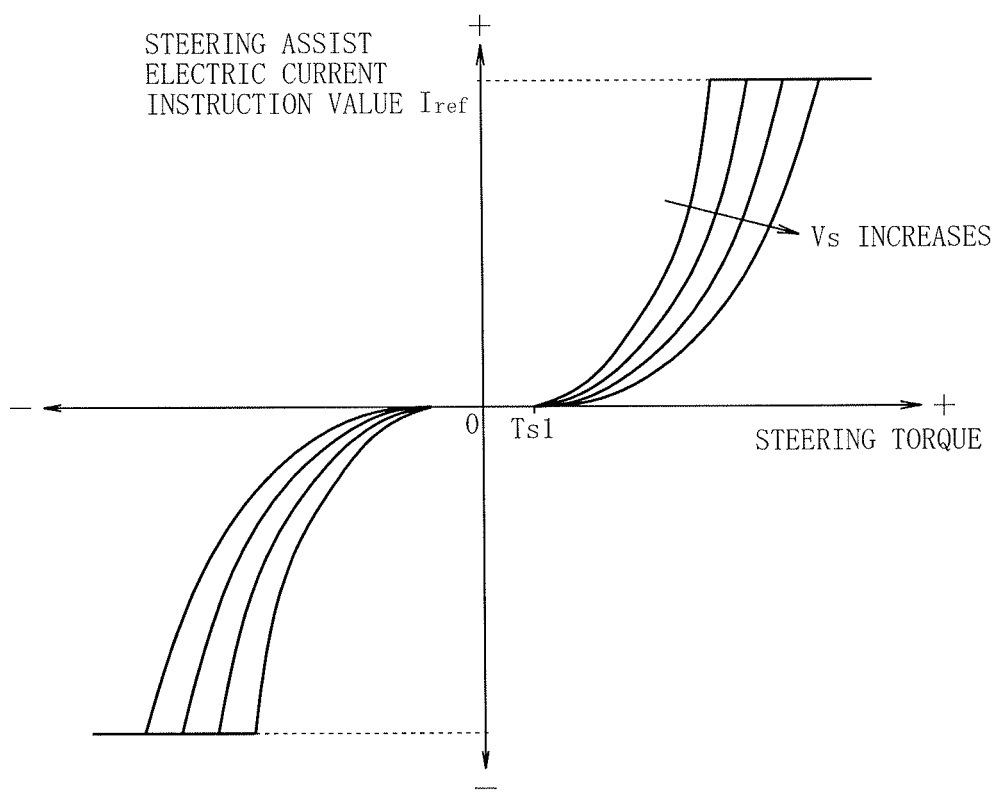
FIG. 4 is a steering assist electric current instruction value calculating map.

The steering assist electric current instruction value calculation section 31 calculates the steering assist electric current instruction value Iref based on steering torque T and vehicle speed Vs with reference to a steering assist electric current instruction value calculating map given in FIG. 4. The steering assist electric current instruction value calculating map is composed of a characteristic line graph represented by parabolic curved lines with the detected vehicle speed Vs as a parameter, where the horizontal axis gives steering torque T and the vertical axis gives steering assist electric current instruction values Iref, as shown in FIG. 4. The characteristic line graph is set such that the steering assist electric current instruction value Iref remains at "0" from where the steering torque T is "0" until a preset value Ts1 in the vicinity thereof. While the steering assist electric current instruction value Iref increases more gradually than increase in the steering torque T in the beginning, when the steering torque T exceeds the preset value Ts1. When the steering torque T increases even more, the steering assist electric current instruction value Iref increases sharply in comparison to the increase thereof. Moreover, the characteristic curved lines are set such that the inclines thereof decrease as the vehicle speed Vs increases.

The angle information calculation section 32 includes: an electrical angle conversion section 32a, which converts the rotor rotation angle θm detected by the rotor rotating angle detection circuit 13 to the electrical angle θe; and a differentiating circuit 32b, which differentiates the electrical angle θe output from the electrical angle conversion section 32a and then calculates the electric angular velocity ωe.

The normal-time motor instruction value calculation section 33, as shown in FIG. 3, includes: a d-q axes electric current instruction value calculation section 33d; and a two-phase/three-phase conversion section 33e. The d-q axes electric current instruction value calculation section 33d is composed of a d-axis electric current instruction value calculation section 33a that calculates a d-axis electric current instruction value Idref based on the steering assist electric current instruction value Iref and the electric angular velocity ωe, a d-q axes voltage calculation section 33b, which calculates a d-axis voltage ed(θe) and a q-axis voltage eq(θe) based on the electrical angle θe, and a q-axis electric current instruction value calculation section 33c, which calculates a q-axis electric current instruction value Iqref based on the d-axis voltage ed(θe) and the q-axis voltage eq(θe) output from the d-q axes voltage calculation section 33b, the d-axis electric current instruction value Idref output from the d-axis electric current instruction value calculation section 33a, and the steering assist electric current instruction value Iref output from the steering assist electric current instruction value calculation section 31. The two-phase/three-phase conversion section 33e, which converts the d-axis electric current instruction value Idref output from the d-axis electric current instruction value calculation section 33a and the q-axis electric current instruction value Iqref output from q-axis electric current instruction value calculation section 33c to the three-phase electric current instruction values Iuref, Ivref, and Iwref.

Figure 5:
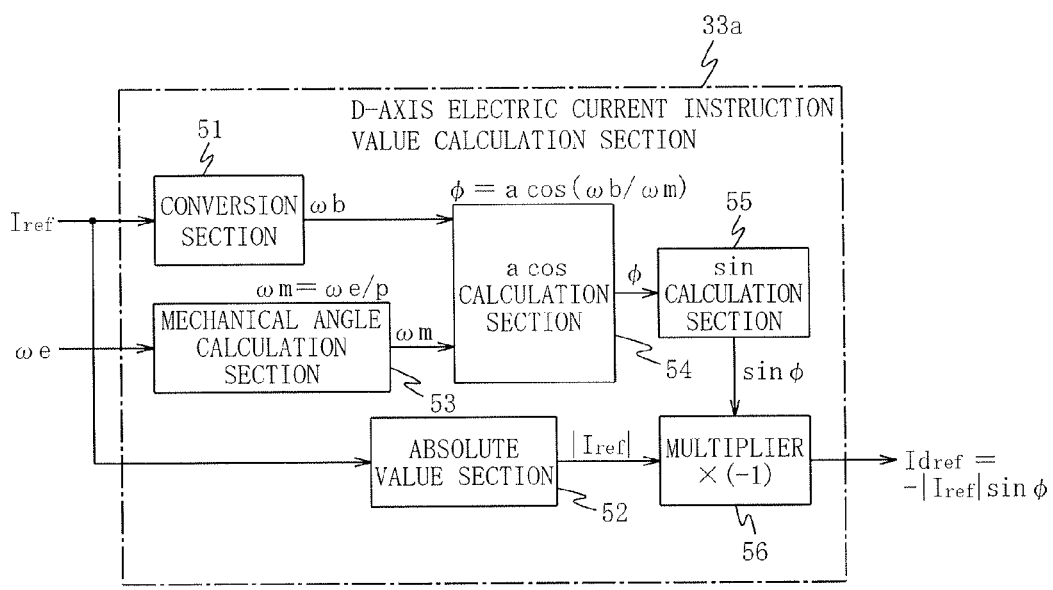
FIG. 5 is a block diagram illustrative of a configuration of a d-axis electric current instruction value calculation section of a vector phase instruction value calculation circuit.

The d-axis electric current instruction value calculation section 33a, as shown in FIG. 5, includes: a conversion section 51, which converts the steering assist electric current instruction value Iref output from the steering assist electric current instruction value calculation section 31 to a base angular velocity ωb for the three-phase brushless motor 12; an absolute value section 52, which calculates the absolute value |Iref| of the steering assist electric current instruction value Iref; a mechanical angle calculation section 53, which calculates a mechanical angular velocity ωm(=ωe/P) of the motor from the electric angular velocity ωe and number of magnetic poles P of the motor; an acos calculation section 54, which calculates a lead angle Φ that equals acos(ωb/ωm) based on the base angular velocity ωb and the mechanical angular velocity ωm, a sin calculation section 55, which finds sin Φ based on the lead angle Φ; and a multiplier 56, which finds a d-axis electric current information value Idref(=−|Iref|sin Φ) by multiplying the absolute value |Iref| from the absolute value section 52 by sin Φ output from the sin calculation section 55 and then multiplying the resulting value by minus one.

Such configuration of the d-axis electric current instruction value calculation section 33a gives the d-axis electric current information value Idref as:

$$Idref = -|Iref| \cdot \sin(acos(\omega b/\omega m)) \quad (1)$$

In regards to acos(ωb/ωm) in the above Equation (1), when the motor rotating velocity is not fast, namely, when the mechanical angular velocity ωm of the three-phase brushless motor 12 is slower than the base angular velocity ωb, acos(ωb/ωm) is 0 since ωm is less than ωb, and thereby Idref is 0. During high-speed rotation, namely, when the mechanical angular velocity ωm is faster than the base angular velocity ωb, however, weak field control begins as the electric current instruction value Idref appears. As represented in the above Equation (1), since the electric current instruction value Idref changes due to the rotating velocity of the three-phase brushless motor 12, there is an advantageous effect that seamless smooth control during high-speed rotation is made possible.

Moreover, it is also effective regarding a problem of saturation of motor terminal voltage. Motor phase voltage V is generally represented as $$V = E + R \cdot I + L(di/dt) \quad (2)$$

where E denotes counter electromotive voltage, R denotes fixed resistance, and L denotes inductance. The counter electromotive voltage E increases as the speed of rotation increases, and the power supply voltage such as a battery voltage is fixed. This narrows the available voltage span for motor control. The angular velocity at which this voltage saturation is reached is the base angular velocity ωb. When voltage saturation occurs, the duty ratio for PWM control reaches 100%, and when this exceeds the value, the electric current instruction value cannot be tracked and torque ripples grow as a result.

However, the d-axis electric current instruction value Idref represented in the above Equation (1) has a negative polarity, and the induced voltage component of the d-axis electric current instruction value Idref related to L·(di/dt) of the above Equation (2) opposes in polarity to the counter electromotive voltage E. Accordingly, this allows the voltage induced by the d-axis electric current instruction value Idref to reduce the counter electromotive voltage E, which increases as rotation speed increases. As a result, even if the three-phase brushless motor 12 rotates at a high speed, the voltage span allowing control of the motor is widened due to the effect of the d-axis electric current instruction value Idref. In other words, there is an effect allowing prevention of growth in torque ripples even when the motor is rotating at high speed with a wider controllable span and without saturation of the motor control voltage due to weak field control by controlling the d-axis electric current instruction value Idref.

Figure 6:
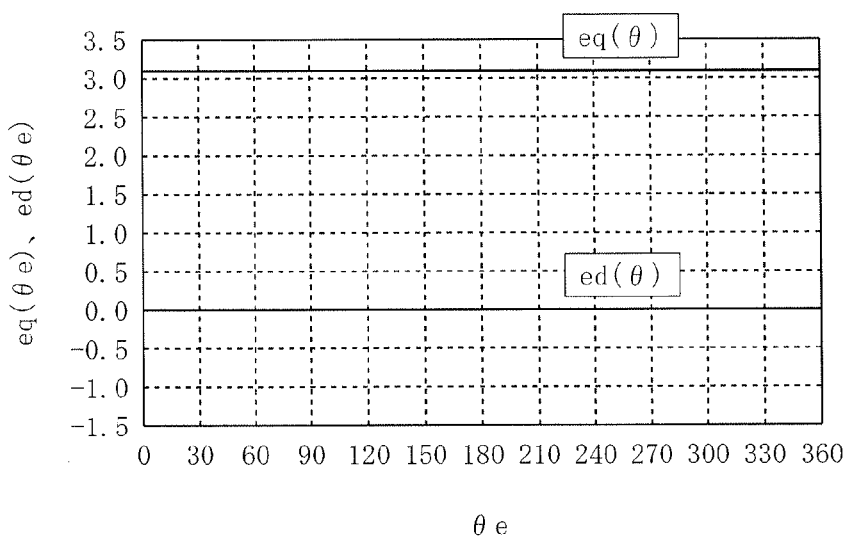
FIG. 6 is a characteristic line graph for a d-q axes voltage calculation memory table.
Figure 7:
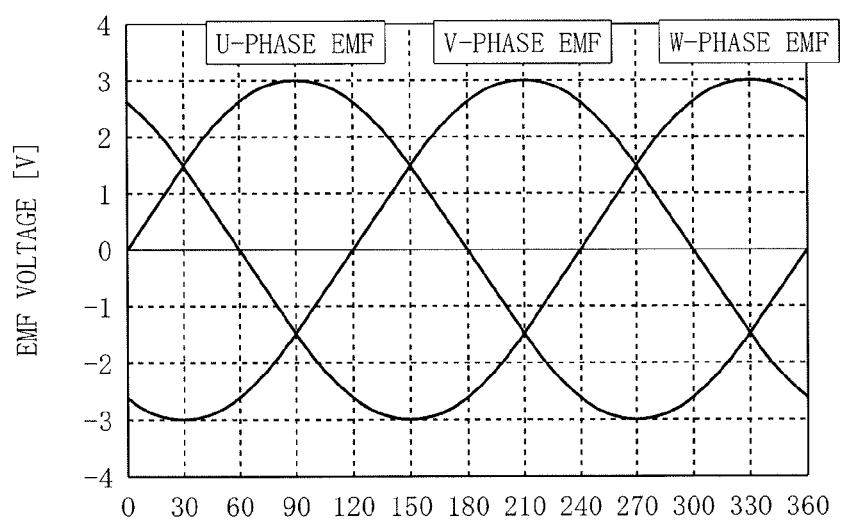
FIG. 7 is a characteristic line graph illustrating induced voltage waveforms generated by a three-phase brushless motor during normal operation.

Furthermore, the d-q axes voltage calculation section 33b calculates the d-axis voltage ed($\theta$e) and the q-axis voltage eq($\theta$e) based on the electrical angle $\theta$e with reference to the d-q axes voltage calculation memory table used as a three-phase drive memory table of FIG. 6. The d-q axes voltage calculation memory table is composed of: electrical angles ee in the horizontal axis and d-axis voltage ed($\theta$) and q-axis voltage eq($\theta$) in the vertical axis, resulting from converting induced voltage waveforms that generate from the respective phase coils to rotational coordinates, as shown in FIG. 6. When the three-phase brushless motor 12 is a sinusoidal induced voltage motor with which induced voltage waveform U-phase EMF, V-phase EMF, and W-phase EMF during normal operation are sinusoidal waves different by 120 degrees from each other, as shown in FIG. 7, both ed($\theta$) and q-axis voltage eq($\theta$) are constant values regardless of the electrical angle $\theta$.

The q-axis electric current instruction value calculation section 33c calculates the q-axis electric current instruction value Iqref by computing the following Equation (3) based on the steering assist electric current instruction value Iref, the d-axis voltage ed($\theta$e), the q-axis voltage eq($\theta$e), the d-axis electric current instruction value Idref, and the electric angular velocity $\omega$e to be input.

$$Iqref=\{Kt \times Iref \times \omega e - ed(\theta e) \times Idref\, \theta e)\}/eq(\theta e) \quad (3)$$

where Kt denotes a motor torque constant.

(Configuration of Abnormal-Time Motor Instruction Value Calculation Section 34)

When an abnormality occurs at a drive system for one phase of the three-phase brushless motor 12, the abnormal-time motor instruction value calculation section 34 calculates a phase current instruction value for continuing rotary drive of the three-phase brushless motor 12 using the remaining two phases.

In the three-phase brushless motor 12, if the drive system of a U-phase coil Lu has a broken wire and the motor current cannot be supplied to the U-phase coil Lu, as shown in FIG. 8(a), for example, coils capable of being supplied with the motor current are only two coils that are V-phase coil Lv and W-phase coil Lw. Directions of the electric currents supplied to the V-phase coil Lv and the W-phase coil Lw include the following two cases: a case of when the motor current is input from the V-phase coil Lv and output from the W-phase coil Lw, and another case of when the motor current is input from the W-phase coil Lw and output from the V-phase coil Lv in an opposite manner.

Stator synthetic magnetic fields generated by these motor currents can be formed only in completely opposite orientations as shown in FIGS. 8B and 8C. Accordingly, two-phase drive of the three-phase brushless motor 12 is impossible by using only these stator synthetic magnetic fields.

Therefore, when a power distribution abnormality occurs in the drive system of the U phase, for example, a motor induced voltage when driving the motor using the remaining V phase and W phase is a composite induced voltage EMFa, which is indicated by a characteristic line L3, resulting from combining induced voltages EMFv ($\theta$e) and ENFw ($\theta$e) indicated by characteristic lines L1 and L2 for the electrical angles $\theta$e. Then, a phase current instruction value Im($\theta$e) is calculated based on the composite induced voltage EMFa, and the aforementioned two-phase current instruction values are then calculated based on this phase current instruction value Im($\theta$e).

Here in this embodiment, when the electric current electrical angle $\theta$e falls within a predetermined acceleration region to be described later, the aforementioned phase current instruction value Im($\theta$e) is increased or decreased for correction so as for the three-phase brushless motor 12 to be accelerated in the steering direction.

Next, a specific configuration of the abnormal-time motor instruction value calculation section 34 will be described.

The abnormal-time motor instruction value calculation section 34 includes an acceleration region judgment section 61, a turn-from-center/return-to-center judgment section 62, an induced voltage calculation section 63, a phase current instruction value calculation section 64, a phase current instruction value correction section 65, an electric current limit section 66, and a two-phase current instruction value calculation section 67, as shown in FIG. 3.

The acceleration region judgment section 61 is supplied with the steering assist electric current instruction value Iref and the electrical angle $\theta$e. Firstly, an acceleration region is set based on the steering assist electric current instruction value Iref. The larger the steering assist electric current instruction value Iref becomes, the wider the acceleration region is set here.

This acceleration region is set at a predetermined angular area that passes over an electrical angle $\theta$e reversing its sign of the phase current instruction value Im($\theta$e) calculated by the phase current instruction value calculation section 64 described later. Specifically, the acceleration region is set at the angular area including before and after an angular area in which the phase current instruction value Im($\theta$e) reaches the phase current maximum value (the maximum electric current value Imax that can be output by the motor drive circuit 24) corresponding to the upper limit of the electric current value allowing power distribution in the drive system of each phase coil.

When a power distribution abnormality occurs at any one of the phases of the three-phase brushless motor 12 and the three-phase brushless motor 12 is rotary driven based on the two-phase current instruction value, the motor torque becomes always zero at the electrical angle ee that inverts the sign of the phase current instruction value Im($\theta$e). Accordingly, the aforementioned acceleration region may also be called an angular area that includes the electrical angle $\theta$e making the motor torque zero.

The acceleration region judgment section 61 then judges whether or not the electric current electrical angle $\theta$e is within the above acceleration region. When it is within the acceleration region, an acceleration region judgment flag Fa is set to "1", and when it is outside of the acceleration region, the acceleration region judgment flag Fa is set to "0".

The turn-from-center/return-to-center judgment section 62 is supplied with the steering torque T and the electrical angle velocity $\omega$e, and based thereon, judges whether steering manipulation of the steering wheel turns either in the turn-from-center direction or in the return-to-center direction.

The steering torque sensor 3 is configured so as to give a sign to the steering torque T and output it with the generated torque during right steering being set to be a positive value and the generated torque during left steering being set to be a negative value. Similarly, the differentiating circuit 32b of the three-phase brushless motor 12 is configured so as to give a sign in accordance with the rotation direction of the three-phase brushless motor 12 and output it. For example, it is configured such that a positive value is given in the case of a rotation direction for applying a steering assist force at the time of steering to the right, and a negative value is given in the case of a rotation direction for applying a steering assist force at the time of steering to the left.

Accordingly, when the sign of the electrical angle velocity ωe is the same as that of the steering torque T, namely when they are either both positive or both negative, the turn-from-center/return-to-center judgment section 62 judges that the turn-from-center steering is performed. When the signs thereof differ, it judges that the return-to-center steering is performed. When the steering direction is judged to be the turn-from-center direction, a turn-from-center/return-to-center judgment flag Fb is set to "1", whereas when steering direction is judged to be the return-to-center direction, the turn-from-center/return-to-center judgment flag Fb is reset to "0", It should be noted that the turn-from-center steering is judged, when the sign of the steering torque T is the same as that of steering torque rate of change and the absolute value of the steering torque rate of change is equal to or greater than a predetermined value. The return-to-center steering is judged, when the sign of the steering torque T is different from that of steering torque rate of change and the absolute value of the steering torque rate of change is equal to or greater than a predetermined value. In this case, judgment of turn-from-center/return-to-center steering is possible using only the steering torque T without using the electrical angle velocity ωe.

The induced voltage calculation section 63 calculates the composite induced voltage EMFa(θe) based on the electrical angle θe and an abnormality detection signal AS output from the abnormality detection circuit 27 to be described later.

Figure 9:
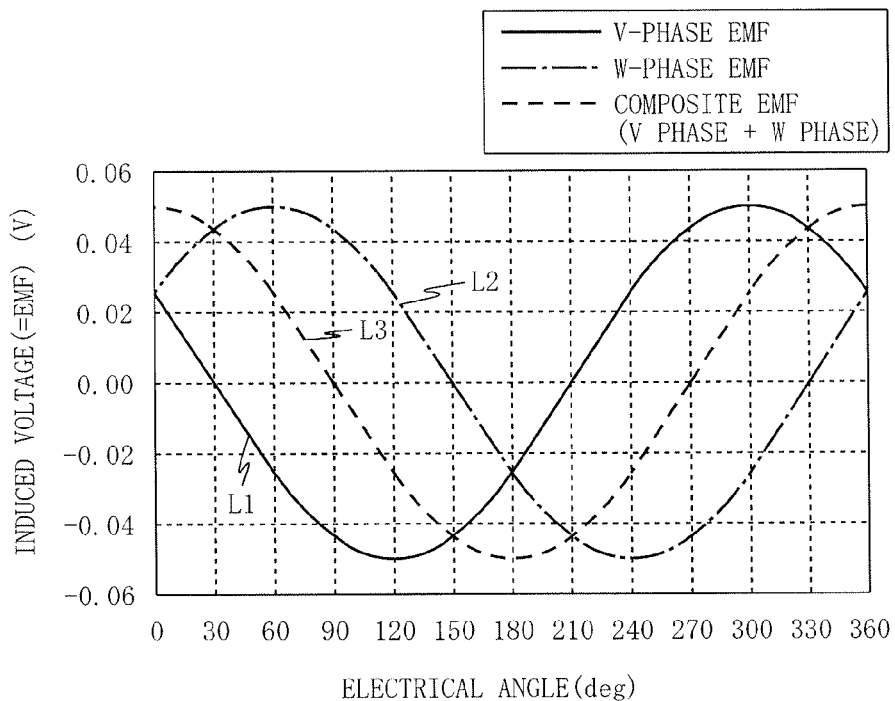
FIG. 9 is a characteristic line graph showing motor induced voltages during two-phase power distribution in the three-phase brushless motor.

The induced voltage calculation section 63 has three memory tables for composite induced voltage calculation: a memory table for composite induced voltage calculation, which shows a relationship between composite induced voltage EMFa and electrical angle θe represented by the characteristic curved line L3 of FIG. 9 in the case of driving in the V-W2 phase; a composite induced voltage calculation table, which shows a relationship between composite induced voltage EMFa and electrical angle θe in the case of driving in the U-V2 phase; and a memory table for composite induced voltage calculation, which shows a relationship between composite induced voltage EMFa and electrical angle θe in the case of driving in the U-W2 phase. The memory table for the composite induced voltage calculation corresponding to the two normal phases is selected based on the abnormality detection signal AS. The composite induced voltage EMFa(θe) is then calculated while referencing to the memory table for the composite induced voltage calculation selected based on the electrical angle θe.

The phase current instruction value calculation section 64 calculates a phase current instruction value Im(θe) based on the composite induced voltage EMFa(θe) calculated by the induced voltage calculation section 63, the steering assist electric current instruction value Iref, and the electric angular velocity ωe.

That is to say, the phase instruction value calculation section 64 calculates the phase current instruction value Im(θe) by computing the following Equation (4).

$$Im(\theta e) = (Kt2 \times Iref \times \omega e)/EMFa(\omega e) \quad (4)$$

where Kt2 denotes a motor torque constant at the time of two-phase power distribution.

The phase current instruction value correction section 65 is supplied with the phase current instruction value Im(θe) calculated by the phase current instruction value calculation section 64, corrects it, and the outputs a corrected phase current instruction value Im*(θe). In this case, when the acceleration region judgment flag Fa is 1, increasing or decreasing of the phase current instruction value Im(θe) for correction is carried out in accordance with the turn-from-center/return-to-center judgment flag Fb and the steering assist electric current instruction value Iref.

More specifically, when the steering direction in the acceleration region is the turn-from-center direction (Fa=1, Fb=1), the phase current instruction value Im(θe) is increased for correction. Such an increase for correction in this case may be carried out by multiplying the phase current instruction value Im(θe) by a correction gain K1 (>1), for example.

Figure 10:
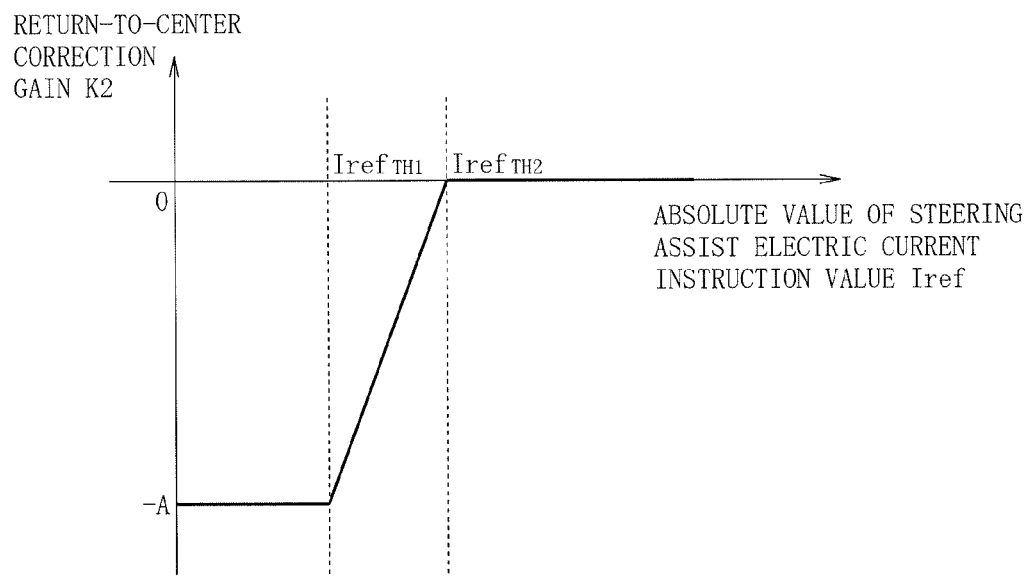
FIG. 10 is a diagram illustrative of an example of return-to-center correction gains.

Meanwhile, when the steering direction in the acceleration region is the return-to-center direction (Fa=1, Fb=0), the phase current instruction value Im(θe) is corrected by multiplying the phase current instruction value Im(θe) by a return-to-center correction gain K2 having the characteristics shown in FIG. 10 in accordance with the absolute value of the steering assist electric current instruction value Iref.

The return-to-center correction gain K2 is 0 (or substantially 0) when Iref>=$Iref_{TH2}$ and K2 is -A when Iref<$Iref_{TH1}$, as shown in FIG. 10, where A<=1. Moreover, the return-to-center correction gain K2 is set so as to change gradually from -A to 0 as the steering assist electric current instruction value Iref increases, when $Iref_{TH1}$<=Iref<$Iref_{TH2}$ is satisfied.

Namely, when Iref>=$Iref_{TH2}$, the phase current instruction value Im(θe) is decreased for correction to 0 (or substantially 0). On the other hand, when Iref<$Iref_{TH1}$, the sign of the phase current instruction value Im(θe) is inverted and decreased for correction.

Furthermore, when=$Iref_{TH1}$<=Iref<$Iref_{TH2}$, the correction amount of the phase current instruction value Imθe is gradually changed by using the steering assist electric current instruction value Iref as a reference to prevent a drastic change. In this manner, a gradual change region in which the correction amount of the phase current instruction value Im(θe) is gradually changed according to the steering assist electric current instruction value Iref.

The aforementioned thresholds $Iref_{TH1}$ and $Iref_{TH2}$ are set based on the steering assist electric current instruction value, as a reference, which generates external load enough for exerting a torque on the motor.

Meanwhile, when the acceleration region judgment flag Fa is 0, the phase current instruction value Im(θe) is decreased for correction regardless of the turn-from-center/return-to-center judgment flag Fb and the steering assist electric current instruction value Iref. The decrease for correction in this case may be carried out by multiplying the phase current instruction value Imθe by a correction gain K3 (<1), for example.

The electric current limit section 66 limits the phase current instruction value Im*(θe), which is calculated by the phase current instruction value correction section 65, with the predetermined maximum electric current value Imax. The predetermined maximum electric current value Imax in this case is set as an electric current upper limit that can be output by the motor drive circuit 24.

The two-phase current instruction value calculation section 67 outputs two-phase current instruction values based on the phase current instruction value limited by the electric current limit section 66.

Here, two phases for power distribution are determined based on the abnormality detection signal AS output from the abnormality detection circuit 27, and in addition, the power distribution direction is set (whether or not electric current is passed from either of the aforementioned two phases for power distribution is set) based on the sign of the phase current instruction value Im*(θe). An electric current instruction value Ikref (k=u to w) in one phase corresponding to the set power distribution direction is output to the instruction value selection section 35 to be described later.

The instruction value selection section 35 includes: change-over switches 71u, 71v, and 71w; and a selection control section 72, which controls changing over these change-over switches 71u, 71v, and 71w.

The phase current instruction values Iuref, Ivref, and Iwref calculated by the two-phase/three-phase conversion section 33e of the normal-time motor instruction value calculation section 33 are input to respective normally-closed contacts of the change-over switches 71u, 71v, and 71w, and the phase current instruction values Iuref, Ivref, and Iwref output from the abnormal-time motor instruction value calculation section 34 are input to the other respective normally-opened contacts.

When the abnormality detection signal AS output from the abnormality detection circuit 27 is "0", which indicates that all of the phases are normal, the selection control section 72 outputs a select signal for the logical value "0" for selecting the normally-closed contacts of the change-over switches 71u, 71v, and 71w, and outputs a relay control signal for controlling interrupt relay circuits RLY1 to RLY3, described later, to turn on. Meanwhile, when the abnormality detection signal AS is not "0", the selection control section 72 outputs a select signal for a logical value "1" for selecting the normally-opened contacts of the change-over switches 71u, 71v, and 71w, and outputs a relay control signal for controlling the interrupt relay circuit RLYx (x=u to w) corresponding to an abnormal drive system to turn off.

The motor current control section 36 includes: subtracters 81u, 81v, and 81w; and a PI control section 82. The subtracters 81u, 81v, and 81w subtract the motor drive current detection values Iud, Ivd and Iwd flowing through the respective phase coils Lu, Lv, and Lw detected by the motor current detection circuit 22 from the respective phase current instruction values Iuref, Ivref, and Iwref supplied from the instruction value selection section 35 so as to find respective phase current errors ΔIu, ΔIv, and ΔIw. The PI control section 82, which performs proportional-plus-integral control for the found respective phase current errors ΔIu, ΔIv, and ΔIw and calculates instruction voltages Vu, Vv, and Vw.

The instruction voltages Vu, Vv, and Vw output from the PI control section 82 are then supplied to the FET gate drive circuit 25.

The motor drive circuit 24 has an inverter structure in which switching elements Qua and Qub, Qva and Qvb, and Qwa and Qwb, which are composed of serially connected N-channel MOSFETs corresponding to the respective phase coils Lu, Lv, and Lw, are connected in parallel, as shown in FIG. 2. A connection point of the switching elements Qua and Qub, a connection point of the switching elements Qva and Qvb, and a connection point of the switching elements Qwa and Qwb are each connected on the opposite side of a neutral point Pn of the phase coils Lu, Lv, and Lw.

A Pulse Width Modulation (PWM) signal output from the FET gate drive circuit 25 is supplied to gates of the respective switching elements Qua and Qub, Qva and Qvb, and Qwa and Qwb that comprise the motor drive circuit 24.

The interrupt relay circuit 26 is constituted by relay contacts RLY1, RLY2, and RLY 3, which are individually interposed between terminals on the opposite side of the neutral point Pn of the phase coils Lu, Lv, and Lw of the three-phase brushless motor 12 and the respective corresponding connection points of the field-effect transistors Qua and Qub, Qva and Qvb, and Qwa and Qwb of the motor drive circuit 24. On and off states of the respective relay contacts RLY1, RLY2, and RLY 3 are controlled in conformity with the relay control signals output from the selection control section 72. At this time, it is controlled to be closed (on state) in a normal state where no abnormality is detected at all phases by the abnormality detection circuit 27, whereas the relay contact RYLi (i=1 to 3) corresponding to any one of the phases in which an abnormality is detected is controlled to be open (off state).

Furthermore, the abnormality detection circuit 27 is capable of detecting non-conduction and short-circuit abnormalities in the U, V, and W phases by comparing the motor voltage of the respective phases to the voltage instruction values Vu, Vv, and Vw supplied to the FET gate drive circuit 25 or a pulse width modulation signal supplied to the motor drive circuit 24. Moreover, the abnormality detection circuit 27 outputs to the abnormal-time motor instruction value calculation section 34 and the instruction value selection section 35 of the control calculation device 23, an abnormality detection signal AS including "0" when all of the U, V, and W phases are normal, "U1" when the U phase has a non-conduction abnormality, "U2" when the U phase has a short circuit abnormality, "V1" when the V phase has a non-conduction abnormality, "V2" when the V phase has a short circuit abnormality, "W1" when the W phase has a non-conduction abnormality, and "W2" when the W phase has a short circuit abnormality.

Note that the steering torque sensor 3 of FIG. 1 corresponds to a steering torque detection section, the vehicle speed sensor 21 corresponds to a vehicle speed detection section, the steering assist control device 20 corresponds to a motor control section, and the abnormality detection circuit 27 of FIG. 2 corresponds to a coil drive system abnormality detection section.

Moreover, the steering assist electric current instruction value calculation section of FIG. 3 corresponds to a steering assist electric current instruction value computing section, the normal-time motor instruction value calculation section 33 corresponds to a normal-time motor instruction value calculation section, the induced voltage calculation section 63, the phase current instruction value calculation section 64, and the two-phase current instruction value calculation section 67 correspond to an abnormal-time motor instruction value calculation section, and the instruction value selection section 35 and the motor current control section 36 correspond to a motor drive control section. Furthermore, the acceleration region judgment section 61 correspond to an acceleration region judgment section, the turn-from-center/return-to-center judgment section 62 corresponds to a steering direction judgment section, the phase current instruction value correction section 65 corresponds to a motor rotation acceleration section, and the electric current limit section 66 corresponds to an electric current limit section.

(Operation)

Operations of the aforementioned first embodiment are described next.

The respective field-effect transistors Qua to Qwb comprising the motor drive circuit 24 are assumed to be normal here, and the respective phase coils Lu to Lw of the three-phase brushless motor 12 are assumed in a normal state where neither disconnection nor earth fault has occurred. In this case, since an abnormal state is never detected by the abnormality detection circuit 27, the abnormality detection circuit 27 outputs an abnormality detection signal AS representing "0" to the abnormal-time motor instruction value calculation section 34 and the instruction value selection section 35.

The selection control section 72 of the instruction value selection section 35 outputs a selection signal for the logical value "0" to the change-over switches 71u to 71w. Therefore, the respective change-over switches 71u to 71w select the normally-closed contact and the phase current instruction values Iwref to Iwref output by the normal-time motor instruction value calculation section 33 are supplied to the motor current control section 36. At the same time, a relay control signal for controlling the respective relay contacts RLY1 to RLY3 into a closed state is output.

This causes the motor drive currents Iu, Iv, and Iw output from the motor drive circuit 24 to be supplied to the respective phase coils Lu, Lv, and Lw of the three-phase brushless motor 12 via the relay contacts RLY1, RLY2, and RLY3. Namely, motor drive control using three phase coils is performed.

At this time, if the vehicle stops and the driver is not steering the steering wheel 1, the normal-time motor instruction value calculation section 33 of the control calculation device 23 calculates the phase current instruction values Iuref, Ivref and Iwref as "0". At this time, when the three-phase brushless motor 12 is stopped, the motor currents Iu, Iv, and Iw supplied to the respective phase coils Lu, Lv, and Lw become "0", and the three-phase brushless motor 12 remains in the stopped state.

If the steering wheel 1 is in a so-called stationary steering condition, namely a condition in which the steering wheel 1 is steered from the non-steering state where when the vehicle is stopped, the steering torque sensor 3 detects a large steering torque T in accordance therewith. The normal-time motor instruction value calculation section 33 calculates the phase current instruction values Iuref, Ivref and Iwref in accordance with this steering torque T and supplies them to the motor current control section 36.

The motor current control section 36 then calculates instruction voltages Vu, Vv, and Vw based on the phase current instruction values Iuref, Ivref and Iwref and supplies them to the FET gate drive circuit 25. The respective field-effect transistors of the motor drive circuit 24 are controlled so as to rotary drive the three-phase brushless motor 12 as a result. Therefore, the three-phase brushless motor 12 generates a steering assist force in accordance with the steering torque T input to the steering wheel 1, and this force is conveyed to the steering shaft 2 via the acceleration gear 11. This allows the driver to steer the steering wheel 1 with a light steering force.

Assuming here that this normal state changes to a state in which, for example, the drive system for driving the U-phase coil Lu, namely the field-effect transistors Qua and Qub of the motor drive circuit 24 keep in the off state, or to a state in which disconnection occurs at a power distribution path including the U-phase coil U due to a non-conduction abnormality developed in the U-phase coil Lu. In this case, the abnormality is detected by the abnormality detection circuit 27, and the abnormality detection circuit 27 then outputs an abnormality detection signal AS of "U1" representing non-conduction abnormality to the abnormal-time motor instruction value calculation section 34 and the instruction value selection section 35.

This allows changing over of the selection switches 71u to 71w from the normally-closed contact side to the normally-opened contact side. Therefore, the phase current instruction values to be supplied to the motor current control section 36 may be changed over from phase current instruction values Iuref, Ivref and Iwref output by the normal-time motor instruction value calculation section 33 to phase current instruction values Iuref, Ivref and Iwref output by the abnormal motor instruction value calculation section 34.

Since the abnormality detection signal AS input to the abnormal-time motor instruction value calculation section 34 from the abnormality detection circuit 27 is "U1", a composite induced voltage $EMFa(\theta e)$ of the V-phase induced voltage and the W-phase induced voltage is calculated based on the electrical angle $\theta e$ input from the angle information calculation section 32. The calculated composite induced voltage $EMFa(\theta e)$ is supplied to the phase current instruction value calculation section 64, and the above Equation (4) is then computed by the phase current instruction value calculation section 64 so as to calculate the phase current instruction value $Im(\theta e)$.

If the electrical angle $\theta e$ does not reach the acceleration region at this time, the acceleration region judgment section 61 outputs an acceleration region judgment flag Fa which equals "0". Moreover, in the case when the driver is steering the steering wheel 1 in the turn-from-center direction at this time, the turn-from-center/return-to-center judgment section 62 outputs the turn-from-center/return-to center judgment flag Fb which equals "1".

Therefore, the phase electric current instruction value calculation section 65 decreases for correction the phase current instruction value $Im(\theta e)$ calculated by the phase current instruction value calculation section 64. The corrected phase current instruction value $Im^*(\theta e)$ is then supplied to the electric current limit section 66. When the phase current instruction value $Im^*(\theta e)$ exceeds the maximum electric current value Imax at this time, the electric current limit section 66 limits the phase current instruction value $Im^*(\theta e)$ to the maximum electric current value Imax.

The phase current instruction value $Im^*(\theta e)$ output by the electric current limit section 66 is then supplied to the two-phase current instruction value calculation section 67. The two-phase current instruction value calculation section 67 sets whether to have electric current flow from either the V phase or the W phase based on the sign of the phase current instruction value $Im^*(\theta e)$, and then outputs the corresponding phase current instruction values Iuref, Ivref and Iwref to the selection switches 71u to 71w, respectively.

At this time, when the electrical angle $\theta e$ is between 0 and 90 degrees, the W-phase current instruction value Iwref is set to a positive value such that electric current flows from the W-phase coil Lw to the V-phase coil Lv. Note that when the electrical angle $\theta e$ is between 90 and 270 degrees, the W-phase current instruction value Ivref is set to a positive value such that electric current flows from the V-phase coil Lv to the W-phase coil Lw. Moreover, when the electrical angle $\theta e$ is between 270 and 360 degrees, the W-phase current instruction value Iwref is set to a positive value such that electric current flows from the W-phase coil Lw to the V-phase coil Lv. Furthermore, the U-phase current instruction value Iuref is set to "0". In other words, when a power distribution abnormality occurs at the drive system of the U phase, the V-phase current instruction value and the W-phase current instruction value are set to have mutually opposite signs such that the absolute values thereof are equal (set so that sum of the electric current instruction values of two normal phases is zero).

In this manner, a rotating synthetic magnetic field is generated to rotate the rotor, thereby achieving two-phase driving of the three-phase brushless motor 12.

Figure 11:
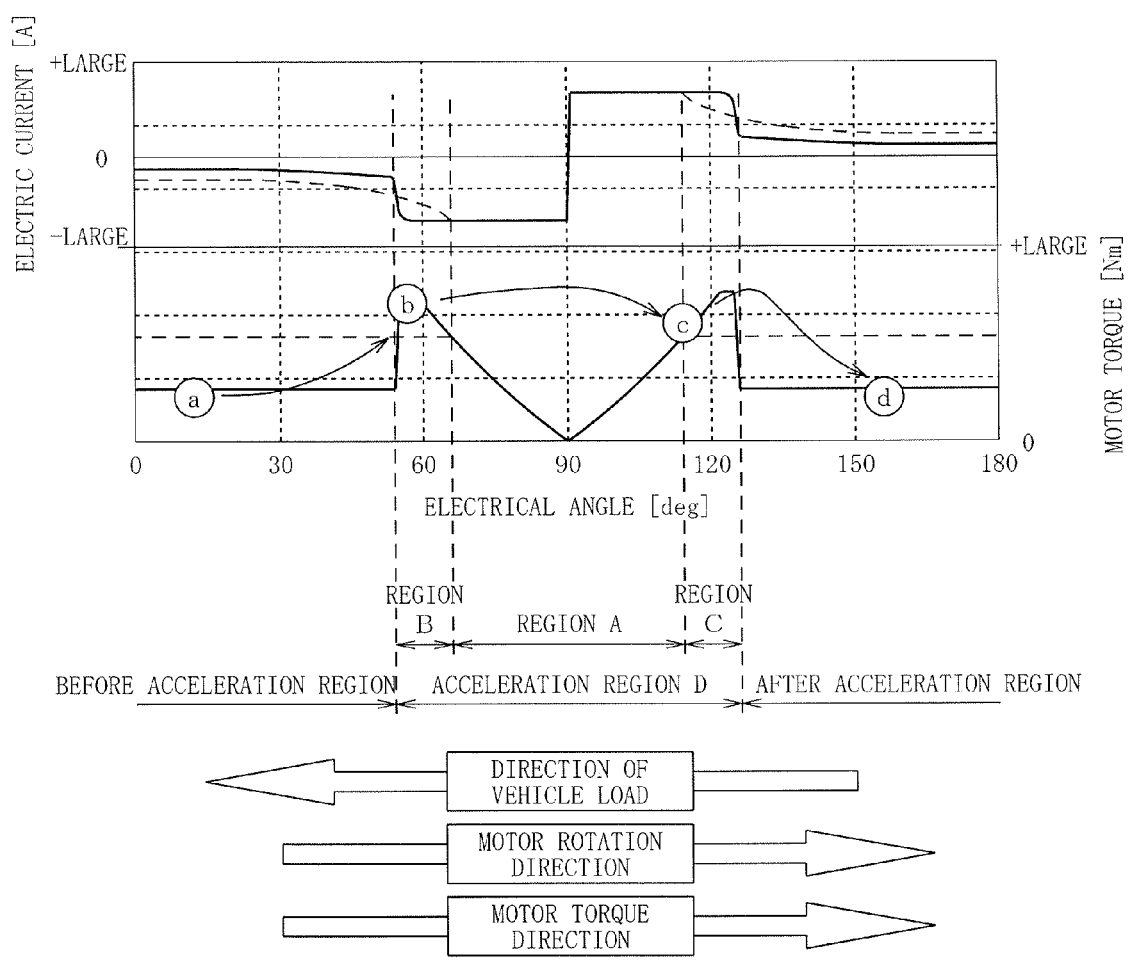
FIG. 11 is a diagram illustrative of motor current and motor torque during turn-from-center steering.

FIG. 11 is a diagram illustrative of motor current and motor torque during the turn-from-center steering. The broken lines indicate motor current and motor torque in the case where the phase current instruction value Im(θe) is not corrected, and solid lines indicate motor current and motor torque in the where the phase current instruction value Im(θe) is corrected. In addition, circles and arrows in the drawing indicate states of the motor.

Since the turn-from-center steering is carried out here, both the motor torque direction and the motor rotation direction are positive (direction from left to right in FIG. 11), and the direction of an external load exerted on the motor is negative (direction from right to left in FIG. 11).

When the phase current instruction value Im(θe) is not corrected as shown by the broken lines in FIG. 11, the motor current increases to a maximum negative electric current value in a circular arc convex at the top in a region (region before reaching region A) before the motor current reaches the electric current upper limit. In region A, the maximum negative value is maintained in the region before 90 degrees, and the maximum positive value is maintained in the region after the sign is inverted at 90 degrees. Moreover, once the motor current passes the region A, the motor current decreases from the maximum positive value in a circular arc convex at the bottom.

The motor torque becomes a steady value at this time in the angular areas before and after the region A, as shown by the broken lines in FIG. 11. The motor torque then decreases and becomes zero at 90 degrees in region A where the phase current reaches the electric current upper limit. Namely, the angular areas before and after the region A are stable output angular areas capable of outputting a steady motor torque. The region A is an unstable output angular area in which electric current is limited by maximum electric current value Imax that can be output from the motor drive circuit 24, and is incapable of providing a stable motor torque.

In this manner, when the three-phase brushless motor is controlled to drive at the time of the power distribution abnormality, there are electrical angles θe (90°, 170°) at which the sign of the phase current instruction value Im(θe) is inverted and the motor torque always becomes zero. In this embodiment, an angular area including the regions (regions B and C) before and after the region A that passes over the electrical angle θe is set as an acceleration region D.

When the electrical angle θe does not reach the acceleration region D, the phase current instruction value correction section 65 outputs to the electric current limit section 66 the phase current instruction value Im*(θe) the phase current instruction value Im(θe) that has been decreased for correction. Since the phase current instruction value Im*(θe) does not exceed the maximum electric current value Imax at this time, the electric current limit section 66 supplies to the two-phase current instruction value calculation section 67 the phase current instruction value Im*(θe) without changing the value supplied from the phase current instruction value correction section 65.

In this manner, the motor current is decreased for correction in the stable output angular area before reaching the acceleration region D, thereby decreasing the motor torque in this region. This intentionally increases the steering torque.

If the electrical angle θe then reaches the acceleration region D, the acceleration region judgment section 61 outputs an acceleration region judgment flag Fa which equals "1". At this time, since the turn-from-center/return-to-center judgment flag Fb equals "1", the phase current instruction value calculation section 65 increases for correction the phase current instruction value Im(θe) calculated by the phase current instruction value calculation section 64.

In this manner, the motor current is increased for correction, when the acceleration region D is reached. This increases the motor torque and accelerates the three-phase brushless motor 12. Such an increase for correction continues, while the electrical angle ee falls within the acceleration region D.

In this acceleration region D, when the phase current instruction value Im*(θe) exceeds the maximum electric current value Imax due to the increase for correction by the phase current instruction value calculation section 65, the electric current is limited by the electric current limit section 66. Accordingly, in the acceleration region D, the maximum negative value and the maximum positive value are maintained in the respective regions before and after 90 degrees. Namely, in regions B and C before and after the region A, the motor current is greater than the case where no correction is indicated by broken lines, so the motor torque thus increases as well.

As such, in this embodiment, the motor current is increased or decreased for correction in the stable output angular areas before and after reaching the electric current limit, namely angular areas freely allowing increase or decrease in the motor torque.

If the electrical angle ee passes over the acceleration region D, the acceleration region judgment section 61 outputs an acceleration region judgment flag Fa which equals "0". Therefore, the phase current instruction value calculation section 65 decreases again, for correction, the phase current instruction value Im(θe) calculated by the phase current instruction value calculation section 64 to decrease the motor torque.

In this manner, since the motor is accelerated in the positive direction in the region B before reaching the region A at the time of the turn-from-center steering, it is possible to pass over the region A incapable of providing a stable motor torque, as shown in the state from circle b to circle c in the drawing. At this time, moreover, the phase current is decreased just before the acceleration region D so as to increase the steering torque. Since the external load exerted on the motor is a vehicle load-steering force (steering torque), the steering torque is increased to make small the external load applied on the motor. As a result, acceleration of the motor is facilitated in the acceleration region D.

Moreover, in acceleration region D, since the motor is accelerated in the positive direction even in the region C after passing over the region A, the motor may be prevented from falling within region A again due to the external load exerted on the motor in the negative direction after region A is passed over once. This allows the motor to progress in the positive direction appropriately, as shown in the state from circle c to circle d in the drawing.

As such, when an abnormality occurs in one of the three phases, continued driving of the three-phase brushless motor 12 using the remaining two phases is possible. Furthermore, at this time, the region A incapable of providing a stable motor torque due to the electric current limitation can be effectively passed over.

The case of the driver carrying out return-to-center steering will be described next.

In this case, the turn-from-center/return-to-center judgment section 62 outputs the turn-from-center/return-to-center flag Fb which equals 0. If the steering assist electric current instruction value Iref is equal to or greater than a threshold $Iref_{TH}$ at this time, the phase current instruction value correction section 65 corrects the motor current to set to "0" in the acceleration region, and at the same time corrects for decreasing the motor current outside of the acceleration region.

Figure 12:
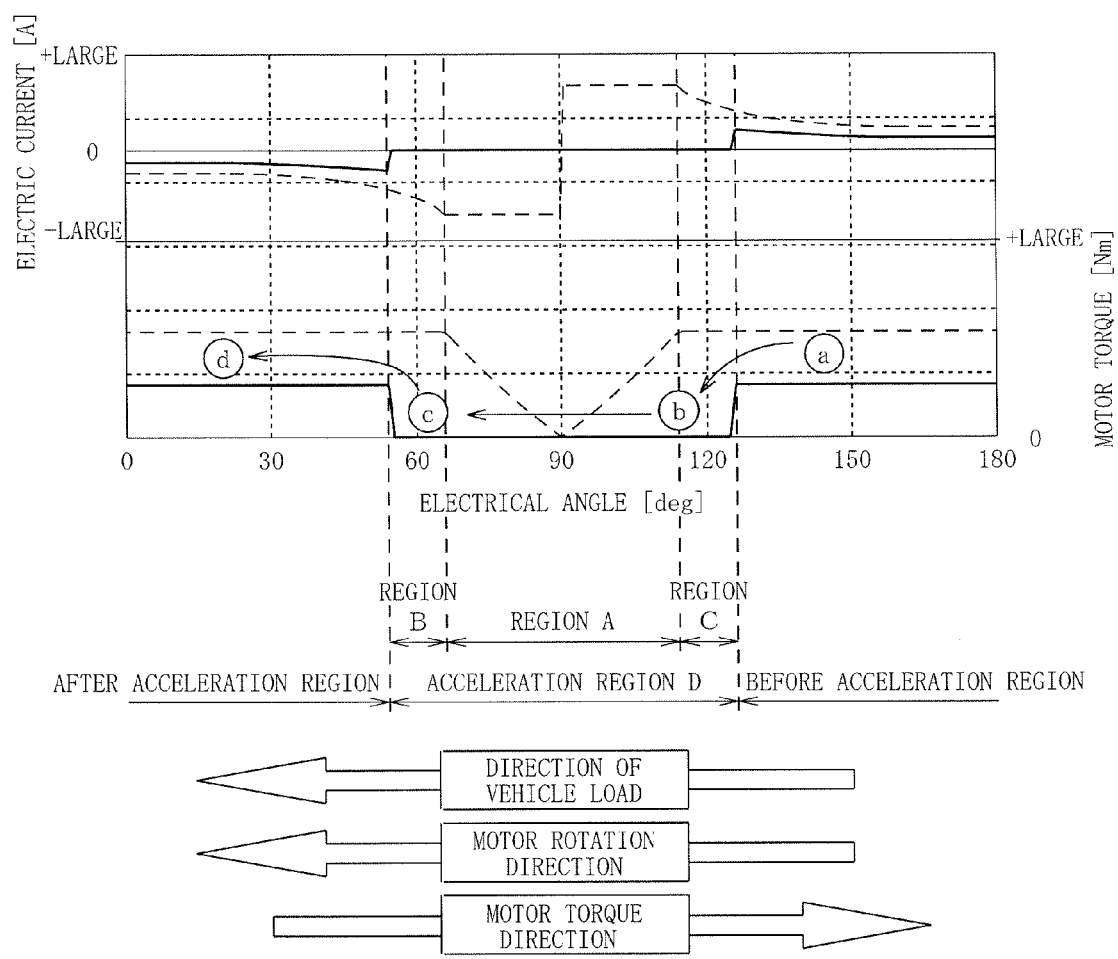
FIG. 12 is a diagram illustrative of motor current and motor torque during return-to-center steering (high level current)

FIG. 12 is a diagram illustrative of motor current and motor torque during the return-to-center steering (high-level current).

In carrying out return-to-center steering, the motor torque direction and the motor rotation direction are not the same. That is, while the motor torque direction is positive (direction from left to right in FIG. 12), the motor rotation direction is negative as is the direction of an external load exerted on the motor (direction from right to left in FIG. 12).

In the region before the electrical angle θe reaches the acceleration region D, the phase current instruction value correction section 65 decreases, for correction, the phase current instruction value Im(θe). This decreases the motor torque in the region before the acceleration region D.

If the electrical angle θe reaches the acceleration region D, the phase current instruction value correction section 65 corrects the phase current instruction value Im(θe) to set to "0". This decrease for correction continues while the electrical angle θe falls within the acceleration region D. Thus, the motor torque also becomes "0" in the acceleration region D.

In the return-to-center steering state, when the steering assist electric current instruction value Iref is equal to or greater than the threshold Iref$_{TH2}$ at this time, such a value is nearly equal to that of the state where a large external load is exerted on the motor. Therefore, in this case, the motor current is set to 0, the motor is accelerated in the negative direction using the external load exerted on the motor, by utilizing the fact that the motor rotation direction and the direction of the external load exerted on the motor are the same.

Since the motor torque in this situation is decreased in the region before the acceleration region D as described above, the difference in the motor torque is small before and after reaching the acceleration region D. This allows facilitation of transfer of the state of the motor from circle a to circle b.

If the electrical angle θe passes the acceleration region D thereafter, the phase current instruction value correction section 65 decreases again, for correction, the phase current instruction value Im(θe). The motor torque is decreased as a result. Therefore, even in this case, in the acceleration region D and after the acceleration region D is passed, the difference in the motor torque can be reduced and transfer of the state of the motor from circle c to circle d can be facilitated.

As such, the region A incapable of providing a stable motor torque due to the electric current limitation may be effectively passed over.

Meanwhile, in the case where the steering assist electric current instruction value Iref is less than the threshold Iref$_{TH1}$ at the time of the return-to-center steering, the phase current instruction value correction section 65 corrects the motor current by inverting and decreasing the motor current in the acceleration region, and in addition, decreases for correction the motor current outside of the acceleration region.

Figure 13:
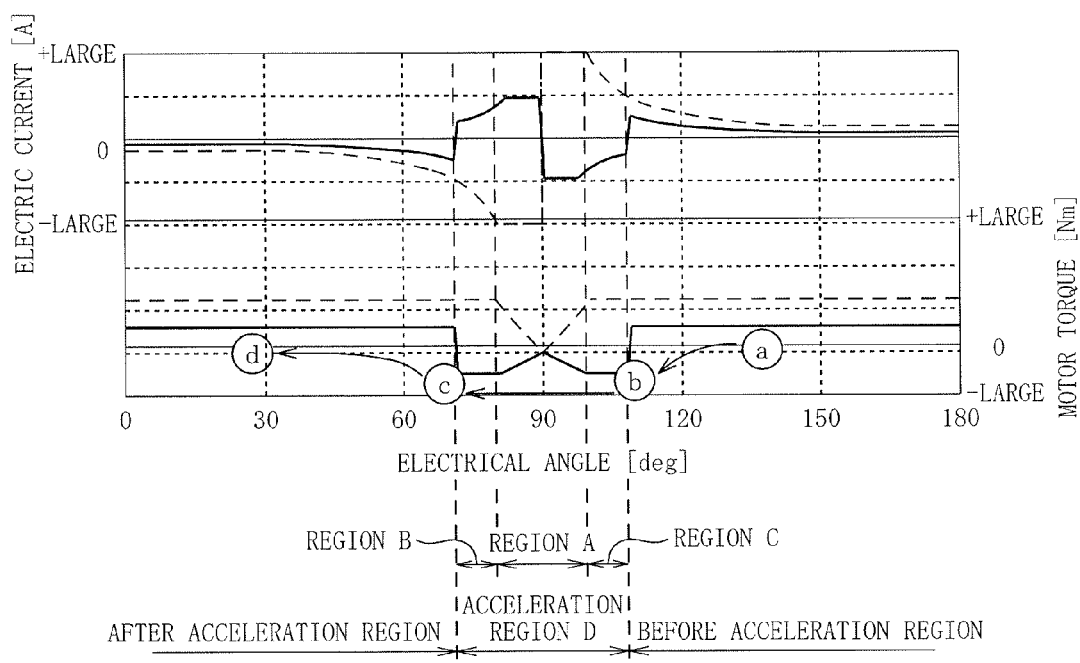
FIG. 13 is a diagram illustrative of motor current and motor torque during return-to-center steering (low level current)
Figure 13:
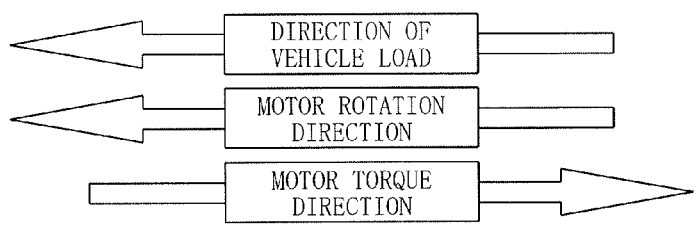

FIG. 13 is a diagram illustrative of the phase electric current and motor torque during the return-to-center steering (low-level current).

Namely, in the region before the electrical angle θe reaches the acceleration region D, the phase current instruction value correction section 65 decreases for correction the phase current instruction value Im(θe). This decreases the motor torque in the region before the acceleration region D.

If the electrical angle θe reaches the acceleration region D, the phase current instruction value correction section 65 inverts the sign of the phase current instruction value Im(θe) and decreases for correction the value.

In the return-to-center state here, when the steering assist electric current instruction value Iref is relatively small, the value is nearly equal to that of the small state of the external load exerted on the motor. Thus, the motor acceleration utilizing the external load exerted on the motor cannot be expected. Consequently, the motor current is made to flow in the reverse direction, generating a counter torque, and thereby accelerating the motor in the negative direction.

Since the motor torque is decreased as described above in the region before acceleration region D, and the motor torque is decreased due to correction by decreasing the phase current instruction value Im(θe) even in the acceleration region D. Accordingly, the difference in the motor torque is small before and after reaching the acceleration region D. This allows facilitation of transfer of the state of the motor from circle a to circle b.

Moreover, if the phase current instruction value Im(θe) changes dramatically, there is a possibility of exceeding a control response property of electric current feedback control and becoming overcurrent. On the other hand, since in this embodiment, when the signal of the phase current instruction value Im(θe) is inverted, the value is decreased for correction. This prevents a dramatic change in the phase current at the time of transferring from the outside of the acceleration region D into the acceleration region D (or the reverse), thereby preventing overcurrent.

If the electrical angle θe passes over the acceleration region D thereafter, the phase current instruction value correction section 65 decreases, for correction, the phase current instruction value Im(θe) again. The motor torque is decreased as a result. Therefore, even in this case, in the acceleration region D and after the acceleration region D is passed, the difference in the motor torque can be reduced, and transfer of the state of the motor from circle c to circle d can be facilitated.

As such, the region A incapable of providing a stable motor torque due to the electric current limitation can be effectively passed over.

However, as a method (comparative example) of passing over the region A, an over-assist characteristic is provided before the region A, and an under-assist characteristic is provided after the region A.

FIG. 14 is a diagram describing operations in the aforementioned comparative example. FIG. 14A shows the phase current at the time of turn-from-center steering, FIG. 14B shows the motor torque at the time of the turn-from-center steering, FIG. 14C shows the phase current at the time of the return-to-center steering, and FIG. 14D shows the motor torque at the time of the return-to-center steering. They all illustrate a case of disconnecting the U phase and carrying out rotation drive of a motor in the V phase and the W phase.

Figure 14A:
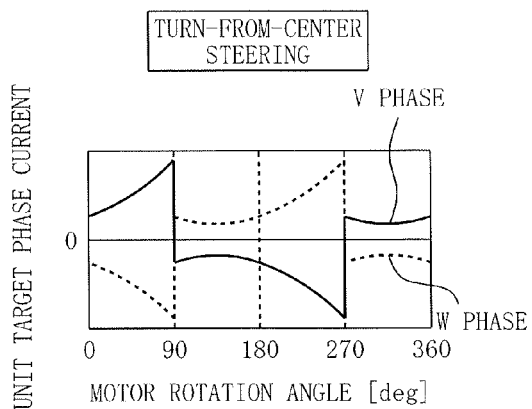
FIG. 14 is a diagram describing operations in a comparative example.
Figure 14C:
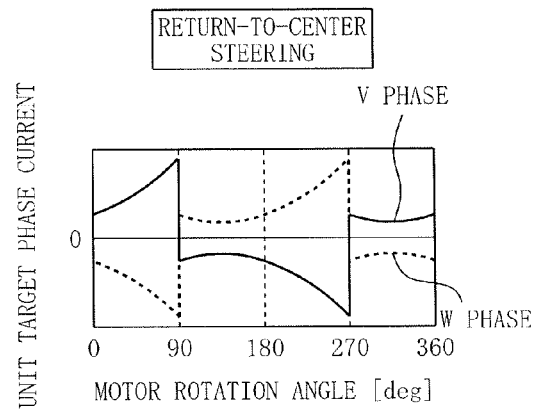
Figure 14B:
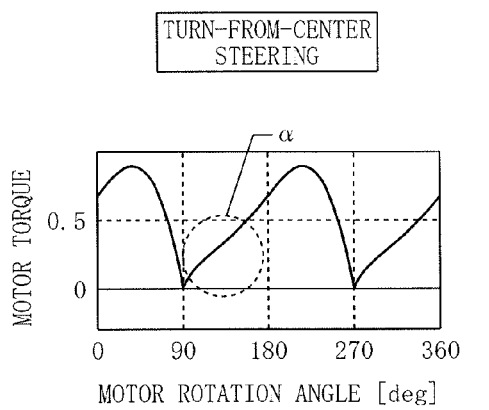
Figure 14B:
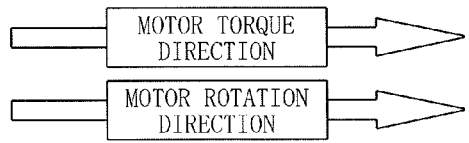

At the time of turn-from-center steering, the rotation of the motor accelerates in the positive direction since the motor torque is increased due to the over-assist characteristic immediately before the motor rotation angles (90 and 270 degrees) at which the motor torque becomes 0, as shown in FIG. 14A and FIG. 14B. However, as indicated by α, the motor torque is decreased due to the under-assist characteristic immediately after the motor rotation angle (90 degrees in this case) at which the motor torque becomes 0. Therefore, the motor rotation angle may stop at 90 degrees as a result of the motor decelerating due to an external load, and the motor rotation angle may give in to the external load and return to 90 degrees.

Figure 14D:
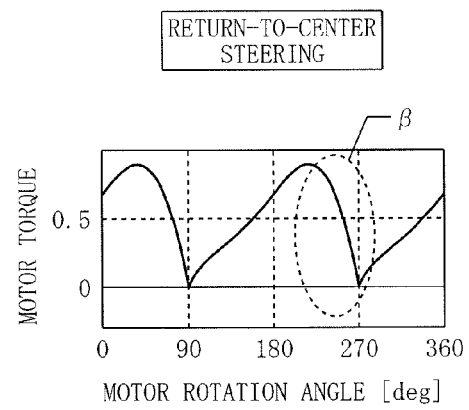
Figure 14D:
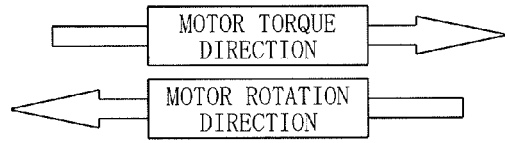

Moreover, at the time of the return-to-center steering, the rotation of the motor accelerates in the negative direction since the motor torque is decreased due to the under-assist characteristic immediately before the motor rotation angles (90°, 270°) at which the motor torque becomes 0, as shown in FIG. 14C and FIG. 14D. However, as indicated by β, the motor torque is increased due to the over-assist characteristic immediately after the motor rotation angle (270° in this case) at which the motor torque becomes 0. Therefore, this may become a braking torque (become a barrier of torque), stopping the motor rotation angle at 270 degrees.

Consequently, in this comparative example, since there is insufficient assist when the return-to-center steering is shifted to the turn-from-center steering, and the steering wheel is felt as if it were caught on something. Accordingly, there is a possibility that the manipulation of the steering wheel intended by the driver cannot be performed, so the steering feeling is deteriorated.

As a different example, there is a device that axially advances the electrical angle in accordance with the motor frequency and steering torque so as to provide an over-assist characteristic and a reverse assist characteristic before region A, while compensating the phase delay of the electric current feedback controller in each phase.

However, even in this case, while the motor accelerates due to the over-assist characteristic at the time of the turn-from-center steering, the reverse assist characteristic acts as a braking torque, making it easy for the motor to return to the region A. This is not an effective passing-over method. Moreover, although the motor accelerates due to the reverse assist characteristic at the time of return-to-center steering, the over-assist characteristic acts as a braking torque, making it easy for the motor to stop at the region A.

In this manner, since the methods of passing over the region A in these comparative examples are inefficient, it is difficult to employ in a brushless motor with fewer poles and with a larger region A.

Meanwhile, in this embodiment, the phase current instruction value Im(θe) is corrected so as for the motor to be intentionally accelerated in the steering direction in the acceleration region including before and after the region incapable of providing a stable motor torque due to electric current limitations. The correction method of the phase current instruction value Im(θe) is changed in accordance with the steering operations (turn-from-center/return-to-center) of the steering wheel 1. Therefore, with a configuration suited even for a state where appropriate motor torque direction and motor rotation direction for electric power steering do not match, it is possible to pass over the region incapable of providing a stable motor torque.

Note that the abnormality detection circuit 27 outputs an abnormality detection signal AS represented by "U2", when the abnormality of the U-phase drive system detected by the abnormality detection circuit 27 is a short-circuit abnormality at the field-effect transistors Qua and Qub of the motor drive circuit 24. When this is supplied to the selection control section 72 of the instruction value selection section 35, this selection control section 72 supplies to the interrupt relay circuit RLY1 for the U phase a relay control signal, which causes the interrupt relay circuit RLY1 to enter an interrupted state. A power supply system for the U-phase coil Lu of the three-phase brushless motor 12 is accordingly interrupted. Except for this operation, the same processes for the aforementioned non-conduction abnormality are performed so as to control the two-phase power distribution of the three-phase brushless motor 12. Consequently, rotary drive of the motor can be continued even in this case.

Moreover, controlling of power distribution in two normal phases in the same manner as described above even when a non-conduction abnormality or a short abnormality has occurred in the V-phase or W-phase drive circuit aside from the U-phase drive system allows continuation of rotary drive.

(Effects)

As described, in the above first embodiment, when the drive system for the respective phase coils Lu to Lw of the three-phase brushless motor 12 is normal, the normal-time motor instruction value calculation section 33 calculates the respective phase current instruction values Iuref to Iwref as usual, and controls feedback of the three-brushless motor 12 based thereon. This allows the three-phase brushless motor 12 to generate a steering assist force in accordance with the steering torque T and the vehicle speed Vs, thereby allowing optimal steering assist control.

On the other hand, when an abnormality occurs in the drive system for any one of the respective phase coils Lu to Lw of the three-phase brushless motor 12, the abnormal-time motor instruction value calculation section 34 calculates the phase current instruction values Iuref to Iwref in the case of using coils in the two normal phases, and controls feedback of the three-brushless motor 12 based thereon. Consequently, this allows contonous driving of the three-phase brushless motor 12.

At this time, the abnormal-time phase current instruction value is corrected in an angular area including an electrical angle θe in which the sign of the abnormal-time phase current instruction value is inverted and the motor torque then becomes zero, namely, an acceleration region before and after angular area (unstable output angular area) incapable of providing a stable motor torque, so that rotation of the three-phase brushless motor 12 is intentionally accelerated in the steering direction.

This allows acceleration of the motor before reaching the unstable output angular area. Moreover, since the abnormal-time phase current instruction value is increased or decreased for correction after the unstable output angular area is passed, it is possible to prevent the torque from becoming insufficient after the unstable output angular area is passed once, and then from falling again into the unstable output angular area. Furthermore, since the abnormal-time phase current instruction value is increased or decreased for correction such that the motor accelerates in the steering direction, it is possible to prevent the generation of a braking torque in the above acceleration region.

Accordingly, the unstable output angular area may be efficiently passed over by a motor inertia force, so the steering feeling may be improved. It is also applicable even to a brushless motor with a large unstable output angular area (brushless motor with a smaller shaft angle multiplication).

In addition, the larger the steering assist electric current instruction value Iref the larger the acceleration region is set in consideration of the fact that the larger the steering assist electric current instruction value Iref, the larger the angular area width (unstable output angular area width) that reaches the electric current upper limit. The region including before and after the angular area reaching the electric current upper limit may be reliably set as the acceleration region, as in this manner. Accordingly, the abnormal-time phase current instruction value can be increased or decreased for correction in the angular area allowing free increase and decrease of the motor torque before and after the unstable output angular area. As a result, motor torque characteristics for passing over the unstable output angular area can be obtained with certainty.

Furthermore, at the time of the turn-from-center steering, namely when the motor torque direction and the motor rotation direction are the same, the abnormal-time phase current instruction value is increased as overtorque so as to accelerate the motor in the rotation direction. On the other hand, at the time of the return-to-center steering, namely, when motor torque direction and the motor rotation direction are not the same and the external load exerted on the motor is large, the abnormal-time phase current instruction value is set to zero with utilizing the fact that the direction of the external load exerted on the motor and the motor rotation direction are the same. As a result, the motor is accelerated in the rotation direction by the external load exerted on the motor. In addition, at the time of the return-to-center steering, namely, when the motor torque direction and the motor rotation direction are not the same and the external load exerted on the motor is small, a counter torque is intentionally applied to accelerate the motor in the rotation direction because the acceleration of the motor by the external load exerted on the motor cannot be expected.

This allows appropriate acceleration of the motor in accordance with the steering condition. Accordingly, even with a steering condition suited for the electric power steering device, namely a condition where the motor torque direction and the motor rotation direction are not the same, an accelerating force for passing over the unstable output angular area is obtainable.

Inversion and correction by decreasing the abnormal-time phase current instruction value is carried out when the external load exerted on the motor is small at the time of the return-to-center steering. Therefore, the difference in the motor torque when transferring from the outside of the acceleration region into the acceleration region (or vice versa) can be controlled, thereby facilitating transfer to a stable region. This also suppresses drastic fluctuation in the motor current, thereby controlling generation of overcurrent.

Furthermore, while the external load exerted on the motor at the time of the return-to-center steering is changed from large to small or small to large, the correction amount of the abnormal-time phase current instruction value is gradually changed. Therefore, smooth steering may be maintained, thus preventing any discomfort.

Moreover, the abnormal-time phase current instruction value is decreased for correction at the outside of the acceleration region. Therefore, in the turn-from-center steering, the steering torque is intentionally increased in the angular area before the electrical angle reaches the acceleration region, the external load exerted on the motor is kept small, thereby facilitating motor acceleration. Furthermore, in the return-to-center steering, the motor torque is decreased in the angular area before the electrical angle reaches the acceleration region. This allows control of differences in the motor torque when a stable output angular area is transferred to the acceleration region (or vice versa), thereby facilitating transfer to the stable region.

Second Embodiment

A second embodiment of the present invention will be described next.

This second embodiment has been made so as to change the magnitude of the maximum electric current value Imax in accordance with the vehicle speed Vs in contrast to the first embodiment described above having the maximum electric current value Imax fixed by an electric current limiting value.
(Configuration)

Figure 15:
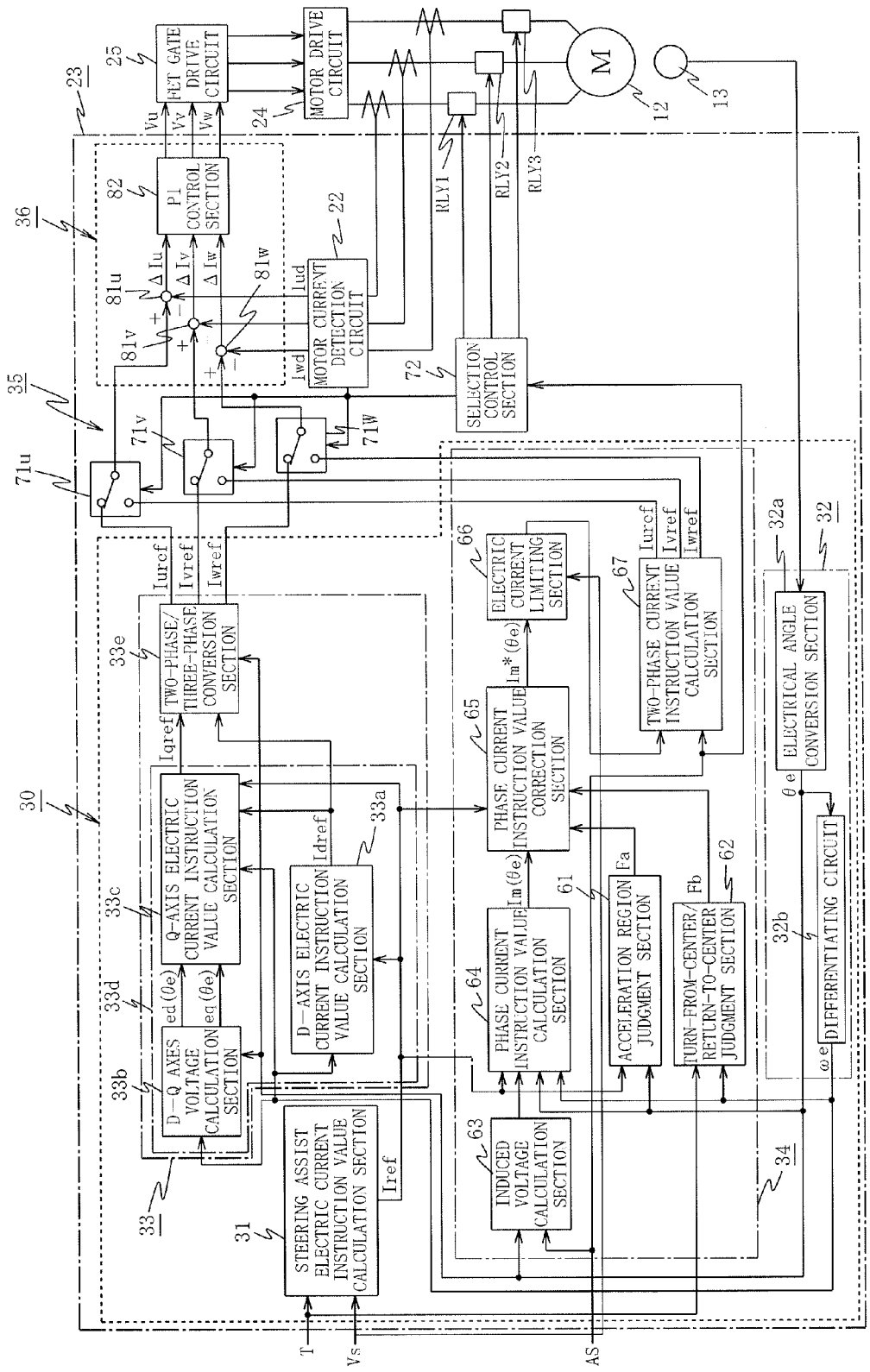
FIG. 15 is a block diagram illustrative of a configuration of a control calculation device 23 according to a second embodiment.

FIG. 15 is a block diagram illustrative of the configuration of a control calculation device 23 according to the second embodiment.

The control calculation device 23 in this second embodiment has the same configuration as that of the control calculation device 23 shown in FIG. 3 except that the vehicle speed Vs detected by the vehicle speed sensor 21 is input to the electric current limit section 66. Accordingly, such different configuration will be mainly described here.

The electric current limit section 66 limits the phase current instruction value Im*(θe) calculated by the phase current instruction value correction section 65. At this time, the lower the vehicle speed Vs, the smaller the maximum electric current value, so that the maximum electric current value Imax is set to 0 (or substantially 0) at a low vehicle speed including vehicle stopped state. In other words, the maximum electric current value Imax is set as shown in FIG. 16, for example.

Figure 16:
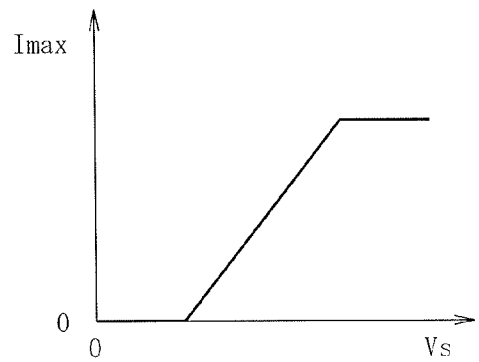
FIG. 16 is a diagram illustrative of an example of the maximum electric current values Imax.

Note that characteristics of the maximum electric current value Imax are not limited to those shown in FIG. 16 as long as the maximum electric current value Imax is set to 0 (or substantially0) during the aforementioned low vehicle speed.
(Operation)

Assume that stationary steering is carried out in the turn-from-center direction in a state where an abnormality occurs at one phase of the three-phase brushless motor 12. Since the vehicle speed Vs is 0 in this case, the maximum electric current value Imax is set to 0 by the electric current limit section 66 of the abnormal-time motor instruction value calculation section 34. The electric current limit section 66 therefore limits the phase current instruction value Im*(θe) to "0" and supplies it to the two-phase current instruction value calculation section 67.

Accordingly, the respective phase current instruction values Iwref to Iwref are each set to "0", and the steering assist becomes "0", thereby changing to a manual steering state.

In the stationary steering, the external load exerted on the motor when the vehicle is running is extremely large. The acceleration energy for passing over the angular area incapable of providing a stable motor torque becomes extremely large as a result. In other words, even if the acceleration region is set and the rotation of the motor in the acceleration region is accelerated as in the first embodiment described above, the angular area incapable of providing a stable motor torque cannot be passed over. Therefore, a strong feeling of being caught on something may be presented to the driver. Although this is not reflected in the vehicle behavior at this time, there is a possibility that a situation such as the driver's fingers being caught on the steering wheel due to a sudden change in the load of the steering wheel.

Therefore, in this embodiment, as the vehicle speed Vs becomes smaller, the maximum electric current value Imax used for electric current limitation is set smaller by the electric current limit section 66. When the vehicle speed Vs is a predetermined low speed or less, the maximum electric current value Imax is set to "0" and the steering assist is also set to "0". At the time of the stationary steering, it is possible to suppress a sudden change in the load of the steering wheel caused by the fact that the angular area incapable of providing a stable motor torque cannot be passed over.
(Effects)

In this manner, the maximum abnormal-time phase current instruction value is limited by a predetermined maximum electric current value (electric current limiting value) in the above second embodiment. When the vehicle speed is equal to or less than a predetermined value, the maximum electric current value is set to zero and the steering assist is also set to zero.

Accordingly, in the time of turn-from-center steering while the vehicle is in a stopped state, it is possible to suppress a sudden change in the load of the steering wheel cause by the fact that the region incapable of providing a stable motor torque cannot be passed over since the external load exerted on the motor is extremely large. This allows prevention of a situation such as the driver's fingers caught on the steering wheel.

(Modifications to the Embodiments)

Note that in the respective embodiments described above, there has been described the case where a drastic change in the phase current instruction value Im*(θe) is controlled by decreasing for correction, when the sign of the phase current instruction value Im(θe) is inverted within the acceleration region at the time of the return-to-center steering, as shown in FIG. 13. However, with the same intention, limitation on the change in the rate (limit the rate) of the corrected phase current instruction value Im*(θe) may be given in accordance with a response property of the electric current control.

Figure 17:
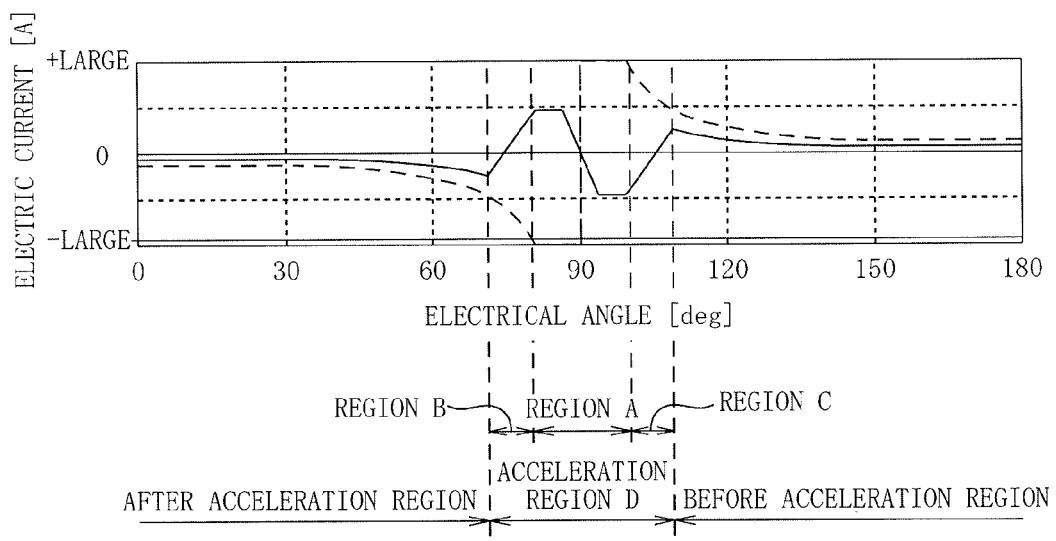
FIG. 17 is a diagram describing modifications of the present invention.
Figure 17:
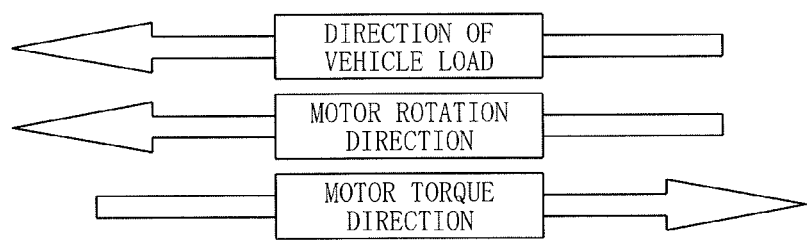

FIG. 17 is a diagram illustrative of the motor current when the rate thereof is limited. Motor current at the time of the return-to-center steering (low-level current) is given here.

Limiting the rate of the corrected phase current instruction value Im*(θe) in this manner allows a more gradual change in the motor current, when the motor current is transferred from the outside of the acceleration region D into the acceleration region D (or vice versa) or when the sign of the phase current instruction value Im*(θe) is inverted. As a result, generation of overcurrent due to a sudden change in the motor current may be controlled.

Moreover, setting of the rate limiting value in accordance with a response property of the electric current control (for example, limiting the value such that the worse the control response is, the more gradual the rate of change becomes) allows reliable control of the overcurrent.

Note that although the case of limiting the rate of motor current at the time of the return-to-center steering (low-level current) has been described heretofore, the rate of motor current at the time of the turn-from-center steering or return-to-center steering (high-level current) may be limited. These cases also allow control of drastic fluctuation in the motor current, thereby suppressing overcurrent.

(Further Modifications)

Note that in the above second embodiment, the phase current instruction value Im*(θe) may be limited by the maximum electric current value Imax in accordance with the vehicle speed Vs only at the time of the turn-from-center steering, and the maximum electric current value Imax may be fixed by an electric current limit at the time of the return-to-center steering. This allows acceleration of the motor in the steering direction using a large external load on the motor, as in the first embodiment described above, at the time of the return-to-center steering, thereby achieving appropriate steering assist control.

Note that in the above respective embodiments, there has been described the case of increasing or decreasing, for correction, the phase current instruction value Im(θe) at a fixed rate by multiplying a preset correction gain when the electrical angle falls within the acceleration region. However, increasing or decreasing for correction may be carried out by adding a fixed correction amount to the phase current instruction value Im(θe) or subtracting a fixed correction amount therefrom, respectively. Alternatively, increasing or decreasing for correction may be carried out such that the corrected phase current instruction value Im*(θe) becomes a preset, predetermined value. Furthermore, the correction amount of the phase current instruction value Im(θe) may also be changed in accordance with the magnitude of the steering assist electric current instruction value Iref.

Even further, although there has been described the case where the interruption relay circuits RLY1 to RLY 3 are interposed between the motor drive circuit 24 and the respective phase coils Lu to Lw of the three-phase brushless motor 12 in the above respective embodiments, any one of the interruption relay circuits RLY1 to RLY 3 may be omitted. In this case, when a short-circuit occurs at the electric-field transistor of the upper arm or lower arm of the motor drive circuit in the drive system that includes the omitted interruption relay circuit, such a short-circuited transistor does not work any longer and applicable regions for two-phase drive in the three-phase brushless motor during normal operation are reduced to only two regions, which will not pose a serious problem.

Even further, although there has been described the case of providing the two-phase/three-phase conversion section 33e on the output side of the d-q axes electric current instruction value calculation section 33d of the normal-time motor instruction value calculation section 33 in the above respective embodiments, this two-phase/three-phase conversion section may be omitted. In this case, instead of this two-phase/three-phase conversion section, the entire control calculation device 23 may be composed of a vector control system, which supplies the motor drive current detection values Iud, Ivd and Iwd output from the motor current detection circuit 22 to a three-phase/two-phase conversion section, converts them to d-axis electric current Idd and q-axis electric current Iqd in rotational coordinates, calculates electric current deviations ΔId and ΔIq by subtracting the d-axis electric current Idd and the q-axis electric current Iqd from a d-axis electric current instruction value Idref and a q-axis electric current instruction value Iqref by the motor current control section 36, calculates d-axis instruction voltage Vd and q-axis instruction voltage Vq through PI control thereof at the PI control section 82, converts them into three-phase instruction voltages Vu, vv, and Vw by the three-phase/two-phase conversion section, and supplies the resulting voltages to the FET gate drive circuit 25.

INDUSTRIAL APPLICABILITY

According to the electric power steering device of the present invention, when an abnormality occurs in one phase of a three-phase brushless motor, continuous driving of the motor using the remaining two phases is possible, which is useful. Moreover, since the unstable output angular area in which motor torque decreases may be efficiently passed over by a motor inertia force, the steering feeling may be improved, which is useful.

EXPLANATION OF REFERENCES

1 . . . steering wheel, 2 . . . steering shaft, 3 . . . steering torque sensor, 8 . . . steering gear, 10 . . . steering assist mechanism, 12 . . . three-phase brushless motor, 13 . . . rotor rotating angle detection circuit, 20 . . . steering assist control device, 21 . . . vehicle speed sensor, 22 . . . motor current detection circuit, 23 . . . control calculation device, 24 . . . motor drive circuit, 25 . . . FET gate drive circuit, 26 . . . interrupt relay circuit, 27 . . . abnormality detection circuit, 31 . . . steering assist electric current instruction value calculation section, 32 . . . angle information calculation section, 32a . . . electrical angle conversion section, 32b . . . differentiating circuit, 33 . . . normal-time motor instruction value calculation section, 33a . . . d-axis electric current instruction value calculation section, 33b . . . d-q axes voltage calculation section, 33c . . . q-axis electric current instruction value calculation section, 33e . . . two-phase/three-phase conversion section, 34 . . . abnormal-time motor instruction value calculation section, 35 . . . instruction value selection section, 36 . . . motor current control section, 61 . . . acceleration region judgment section, 62 . . . turn-from-center/return-to-center judgment section, 63 . . . induced voltage calculation section, 64 . . . phase electric current instruction value calculation section, 65 . . . phase electric current instruction value correction section, electric current limiting section, 67 . . . phase current instruction value calculation section, 71u~71w . . . change-over switch, 72 . . . selection control section, 81u~81w . . . subtracter, 82 . . . PI control section

The invention claimed is:

1. An electric power steering device comprising:
 a three-phase brushless motor having respective phase coils connected in star connection for applying a steering assist force to a steering system;
 a steering torque detection section for detecting a steering torque transmitted to the steering system; and
 a motor control section for controlling the three-phase brushless motor to drive based on at least the steering torque detected by the steering torque detection section; wherein
 the motor control section comprises:
 a coil drive system abnormality detection section for detecting a power distribution abnormality in a drive system of the respective coils;
 a steering assist electric current instruction value calculation section for calculating a steering assist electric current instruction value based on the steering torque detected by the steering torque detection section;
 a normal-time motor instruction value calculation section for, when an abnormality of the drive system of the respective phase coils has not been detected by the coil drive system abnormality detection section, calculating a normal-time phase current instruction value using three phase coils based on the steering assist electric current instruction value;
 an abnormal-time motor instruction value calculation section for, when an abnormality of the drive system of one phase of the respective phase coils has been detected by the coil drive system abnormality detection section, calculating an abnormal-time phase current instruction value based on the steering assist electric current instruction value such that a sum of phase current instruction values of remaining two phases is zero;
 a motor drive control section for selecting any one of the normal-time phase current instruction value calculated by the normal-time motor instruction value calculation section and the abnormal-time phase current instruction value calculated by the abnormal-time motor instruction value calculation section, and for controlling the three-phase brushless motor to drive based on the selected phase current instruction value;
 an acceleration region judgment section for judging whether or not an electrical angle of the three-phase brushless motor falls within an acceleration region, which is a predetermined angular area including an electrical angle at which a sign of the abnormal-time phase current instruction value calculated by the abnormal-time motor instruction value calculation section is inverted; and
 a motor rotation acceleration section for, when the electrical angle of the three-phase brushless motor is judged to fall within the acceleration region, correcting the abnormal-time phase current instruction value calculated by the abnormal-time motor instruction value calculation section so as to accelerate rotation of the three-phase brushless motor in a steering direction,
 wherein, the motor rotation acceleration section corrects the abnormal-time phase current instruction value by multiplying the abnormal-time phase current instruction value by a constant.

2. The electric power steering device of claim 1, wherein the acceleration region is set to be wider as the steering assist electric current instruction value calculated by the steering assist electric current instruction value calculation section is larger.

3. The electric power steering device of claim 2, wherein the acceleration region is an angular area including before and after an angular area in which the abnormal-time phase current instruction value calculated by the abnormal-time motor instruction value calculation section reaches a phase current upper limit value corresponding to an upper limit of electric current values by which the drive system of the respective phase coils is energized.

4. The electric power steering device of claim 1, further comprising a steering direction judgment section for judging whether steering manipulation causes a steering wheel to turn in a turn-from-center direction or in a return-to-center direction, wherein
 the motor rotation acceleration section applies a correction method to the abnormal-time phase current instruction value in accordance with the steering direction judged by the steering direction judgment section.

5. The electric power steering device of claim 4, wherein when the steering direction judged by the steering direction judgment section is the turn-from-center direction the motor rotation acceleration section increases the abnormal-time phase current instruction value.

6. The electric power steering device of claim 1, wherein the motor rotation acceleration section limits a rate of change in the abnormal-time phase current instruction value by a predetermined rate of change limiting value.

7. The electric power steering device of claim 1, further comprising a vehicle speed detection section for detecting a vehicle speed,
 wherein the motor control section comprises an electric current limit section for limiting a maximum value of the abnormal-time phase current instruction value by an electric current limiting value in accordance with the vehicle speed detected by the vehicle speed detection section, and
 wherein the electric current limit section sets the electric current limiting value to zero or substantially zero when the vehicle speed detected by the vehicle speed detection section is smaller than a predetermined value.

8. The electric power steering device of claim 1, wherein the motor control section comprises a decreasing correction section for decreasing for correction the abnormal-time phase current instruction value calculated by the abnormal-time phase current instruction value calculation section when the electrical angle is judged by the acceleration region judgment section as being outside of the acceleration region.

9. The electric power steering device of claim 2, further comprising a steering direction judgment section for judging whether steering manipulation causes a steering wheel to turn in a turn-from-center direction or in a return-to-center direction, wherein
 the motor rotation acceleration section changes a correction method of the abnormal-time phase current instruction value in accordance with the steering direction judged by the steering direction judgment section.

10. The electric power steering device of claim 3, further comprising a steering direction judgment section for judging whether steering manipulation causes a steering wheel to turn in a turn-from-center direction or in a return-to-center direction, wherein the motor rotation acceleration section changes a correction method of the abnormal-time phase current instruction value in accordance with the steering direction judged by the steering direction judgment section.

11. An electric power steering device, comprising:

a three-phase brushless motor having respective phase coils connected in star connection for applying a steering assist force to a steering system;

a steering torque detection section for detecting a steering torque transmitted to the steering system; and a motor control section for controlling the three-phase brushless motor to drive based on at least the steering torque detected by the steering torque detection section; wherein the motor control section comprises:

a coil drive system abnormality detection section for detecting a power distribution abnormality in a drive system of the respective coils;

a steering assist electric current instruction value calculation section for calculating a steering assist electric current instruction value based on the steering torque detected by the steering torque detection section;

a normal-time motor instruction value calculation section for, when an abnormality of the drive system of the respective phase coils has not been detected by the coil drive system abnormality detection section, calculating a normal-time phase current instruction value using three phase coils based on the steering assist electric current instruction value;

an abnormal-time motor instruction value calculation section for, when an abnormality of the drive system of one phase of the respective phase coils has been detected by the coil drive system abnormality detection section, calculating an abnormal-time phase current instruction value based on the steering assist electric current instruction value such that a sum of phase current instruction values of remaining two phases is zero;

a motor drive control section for selecting any one of the normal-time phase current instruction value calculated by the normal-time motor instruction value calculation section and the abnormal-time phase current instruction value calculated by the abnormal-time motor instruction value calculation section, and for controlling the three-phase brushless motor to drive based on the selected phase current instruction value;

an acceleration region judgment section for judging whether or not an electrical angle of the three-phase brushless motor falls within an acceleration region, which is a predetermined angular area including the electrical angle at which the sign of the abnormal-time phase current instruction value calculated by the abnormal-time motor instruction value calculation section is inverted;

a motor rotation acceleration section for, when the electrical angle of the three-phase brushless motor is judged to fall within the acceleration region, correcting the abnormal-time phase current instruction value calculated by the abnormal-time motor instruction value calculation section so as to accelerate rotation of the three-phase brushless motor in a steering direction; and a steering direction judgment section for judging whether steering manipulation causes a steering wheel to turn in a turn-from-center direction or in a return-to-center direction, wherein the motor rotation acceleration section applies a correction method to the abnormal-time phase current instruction value in accordance with the steering direction judged by the steering direction judgment section, and wherein when the steering direction judged by the steering direction judgment section is the return-to-center direction and the steering assist electric current instruction value calculated by the steering assist electric current instruction value calculation section is equal to or greater than a predetermined value the motor rotation acceleration section corrects the abnormal-time phase current instruction value to be zero or substantially zero.

12. The electric power steering device of claim 11, wherein the motor rotation acceleration section is provided with a gradual-change region in which a correction amount of the abnormal-time phase current instruction value is gradually changed according to the steering assist electric current instruction value during change-over of the correction method of the abnormal-time phase current instruction value based on the predetermined value, when the steering direction judged by the steering direction judgment section is the return-to-center direction.

13. An electric power steering device, comprising:

a three-phase brushless motor having respective phase coils connected in star connection for applying a steering assist force to a steering system;

a steering torque detection section for detecting a steering torque transmitted to the steering system; and a motor control section for controlling the three-phase brushless motor to drive based on at least the steering torque detected by the steering torque detection section; wherein the motor control section comprises:

a coil drive system abnormality detection section for detecting a power distribution abnormality in a drive system of the respective coils;

a steering assist electric current instruction value calculation section for calculating a steering assist electric current instruction value based on the steering torque detected by the steering torque detection section;

a normal-time motor instruction value calculation section for, when an abnormality of the drive system of the respective phase coils has not been detected by the coil drive system abnormality detection section, calculating a normal-time phase current instruction value using three phase coils based on the steering assist electric current instruction value;

an abnormal-time motor instruction value calculation section for, when an abnormality of the drive system of one phase of the respective phase coils has been detected by the coil drive system abnormality detection section, calculating an abnormal-time phase current instruction value based on the steering assist electric current instruction value such that a sum of phase current instruction values of remaining two phases is zero;

a motor drive control section for selecting any one of the normal-time phase current instruction value calculated by the normal-time motor instruction value calculation section and the abnormal-time phase current instruction value calculated by the abnormal-time motor instruction value calculation section, and for controlling the three-phase brushless motor to drive based on the selected phase current instruction value;

an acceleration region judgment section for judging whether or not an electrical angle of the three-phase brushless motor falls within an acceleration region, which is a predetermined angular area including the electrical angle at which the sign of the abnormal-time phase current instruction value calculated by the abnormal-time motor instruction value calculation section is inverted;

a motor rotation acceleration section for, when the electrical angle of the three-phase brushless motor is judged to fall within the acceleration region, correcting the abnormal-time phase current instruction value calculated by the abnormal-time motor instruction value calculation section so as to accelerate rotation of the three-phase brushless motor in a steering direction; and a steering direction judgment section for judging whether steering manipulation causes a steering wheel to turn in a turn-from-center direction or in a return-to-center direction, wherein the motor rotation acceleration section applies a correction method to the abnormal-time phase current instruction value in accordance with the steering direction judged by the steering direction judgment section, and wherein when the steering direction judged by the steering direction judgment section is the return-to-center direction and the steering assist electric current instruction value calculated by the steering assist electric current instruction value calculation section is smaller than a predetermined value the motor rotation acceleration section inverts the sign of the abnormal-time phase current instruction value.

14. The electric power steering device of claim 13, wherein the motor rotation acceleration section decreases the abnormal-time phase current instruction value, when the steering direction judged by the steering direction judgment section is the return-to-center direction and the steering assist electric current instruction value calculated by the steering assist electric current instruction value calculation section is smaller than a predetermined value.

15. The electric power steering device of claim 14, wherein, when the steering direction judged by the steering direction judgment section is the return-to-center direction the motor rotation acceleration section is provided with a gradual-change region in which a correction amount of the abnormal-time phase current instruction value is gradually changed according to the steering assist electric current instruction value during change-over of the correction method of the abnormal-time phase current instruction value based on the predetermined value.

16. An electric power steering device, comprising:

a three-phase brushless motor having respective phase coils connected in star connection for applying a steering assist force to a steering system;

a steering torque detection section for detecting a steering torque transmitted to the steering system; and a motor control section for controlling the three-phase brushless motor to drive based on at least the steering torque detected by the steering torque detection section; wherein the motor control section comprises:

a coil drive system abnormality detection section for detecting a power distribution abnormality in a drive system of the respective coils;

a steering assist electric current instruction value calculation section for calculating a steering assist electric current instruction value based on the steering torque detected by the steering torque detection section;

a normal-time motor instruction value calculation section for, when an abnormality of the drive system of the respective phase coils has not been detected by the coil drive system abnormality detection section, calculating a normal-time phase current instruction value using three phase coils based on the steering assist electric current instruction value;

an abnormal-time motor instruction value calculation section for, when an abnormality of the drive system of one phase of the respective phase coils has been detected by the coil drive system abnormality detection section, calculating an abnormal-time phase current instruction value based on the steering assist electric current instruction value such that a sum of phase current instruction values of remaining two phases is zero;

a motor drive control section for selecting any one of the normal-time phase current instruction value calculated by the normal-time motor instruction value calculation section and the abnormal-time phase current instruction value calculated by the abnormal-time motor instruction value calculation section, and for controlling the three-phase brushless motor to drive based on the selected phase current instruction value;

an acceleration region judgment section for judging whether or not an electrical angle of the three-phase brushless motor falls within an acceleration region, which is a predetermined angular area including the electrical angle at which the sign of the abnormal-time phase current instruction value calculated by the abnormal-time motor instruction value calculation section is inverted;

a motor rotation acceleration section for, when the electrical angle of the three-phase brushless motor is judged to fall within the acceleration region, correcting the abnormal-time phase current instruction value calculated by the abnormal-time motor instruction value calculation section so as to accelerate rotation of the three-phase brushless motor in a steering direction; and a steering direction judgment section for judging whether steering manipulation causes a steering wheel to turn in a turn-from-center direction or in a return-to-center direction, wherein the motor rotation acceleration section applies a correction method to the abnormal-time phase current instruction value in accordance with the steering direction judged by the steering direction judgment section, and wherein the motor rotation acceleration section increases for correction the abnormal-time phase current instruction value, when the steering direction judged by the steering direction judgment section is the turn-from-center direction, and wherein the motor rotation acceleration section corrects the abnormal-time phase current instruction value to be zero or substantially zero, when the steering direction judged by the steering direction judgment section is the return-to-center direction and the steering assist electric current instruction value calculated by the steering assist electric current instruction value calculation section is equal to or greater than a predetermined value the motor rotation acceleration section corrects the abnormal-time phase current instruction value to be zero or substantially zero.

17. The electric power steering device of claim 16, wherein when the steering direction judged by the steering direction judgment section is the return-to-center direction and the steering assist electric current instruction value calculated by the steering assist electric current instruction value calculation section is smaller than a predetermined value the motor rotation acceleration section inverts the sign of the abnormal-time phase current instruction value.

* * * * *